US010356323B2

United States Patent
Nakata et al.

(10) Patent No.: US 10,356,323 B2
(45) Date of Patent: Jul. 16, 2019

(54) IMAGING UNIT AND ELECTRONIC APPARATUS INCLUDING THE SAME

(71) Applicant: SONY SEMICONDUCTOR SOLUTIONS CORPORATION, Kanagawa (JP)

(72) Inventors: Masashi Nakata, Kanagawa (JP); Yousuke Horie, Fukuoka (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/320,375

(22) PCT Filed: Mar. 29, 2016

(86) PCT No.: PCT/JP2016/060176
§ 371 (c)(1),
(2) Date: Dec. 20, 2016

(87) PCT Pub. No.: WO2016/181717
PCT Pub. Date: Nov. 17, 2016

(65) Prior Publication Data
US 2018/0054558 A1 Feb. 22, 2018

(30) Foreign Application Priority Data
May 8, 2015 (JP) .................................. 2015-095494

(51) Int. Cl.
*H04N 5/232* (2006.01)
*G03B 5/00* (2006.01)
(Continued)

(52) U.S. Cl.
CPC ............. *H04N 5/2327* (2013.01); *G03B 5/00* (2013.01); *G03B 7/22* (2013.01); *G03B 7/26* (2013.01);
(Continued)

(58) Field of Classification Search
CPC ...... H04N 5/2327; H04N 5/3745; G03B 5/00; G03B 7/22; G03B 7/26; G03B 17/02
See application file for complete search history.

(56) References Cited

U.S. PATENT DOCUMENTS

| 5,867,213 A * | 2/1999 | Ouchi ................ H04N 5/23248 348/208.2 |
| 2007/0065126 A1* | 3/2007 | Hatanaka ................. G03B 5/00 396/52 |
| 2009/0295230 A1* | 12/2009 | Rousu ................... H02J 7/0068 307/80 |

FOREIGN PATENT DOCUMENTS

| JP | 2001-296575 | 10/2001 |
| JP | 2007-110516 A | 4/2007 |
(Continued)

OTHER PUBLICATIONS

International Search Report prepared by the Japan Patent Office dated Jun. 9, 2016, for International Application No. PCT/JP2016/060176.

*Primary Examiner* — Twyler L Haskins
*Assistant Examiner* — Fayez Bhuiyan
(74) *Attorney, Agent, or Firm* — Sheridan Ross P.C.

(57) ABSTRACT

An imaging unit of an embodiment of the present technology includes: a detector that detects temperature or remaining battery capacity; an imaging device that obtains a captured image; and a first correction section that changes, on a basis of a detection result of the detector, electronic hand shake correction accuracy with respect to the captured image obtained by the imaging device when an electronic hand shake correction function is enabled.

16 Claims, 22 Drawing Sheets

(51) Int. Cl.
*G03B 7/26* (2006.01)
*G03B 7/22* (2006.01)
*G03B 17/02* (2006.01)
*H04N 5/3745* (2011.01)

(52) U.S. Cl.
CPC ........... *G03B 17/02* (2013.01); *H04N 5/2328* (2013.01); *H04N 5/23241* (2013.01); *H04N 5/23254* (2013.01); *H04N 5/23258* (2013.01); *H04N 5/23267* (2013.01); *H04N 5/23274* (2013.01); *H04N 5/3745* (2013.01)

(56) References Cited

FOREIGN PATENT DOCUMENTS

| | | |
|---|---|---|
| JP | 2009-246441 A | 10/2009 |
| JP | 2012-094720 A | 5/2012 |
| JP | 2012-178712 A | 9/2012 |

* cited by examiner

[ FIG. 1A ]
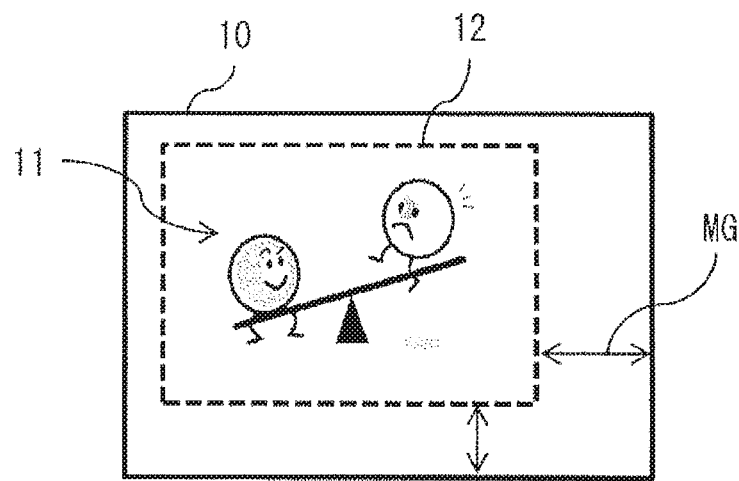
[ FIG. 1B ]
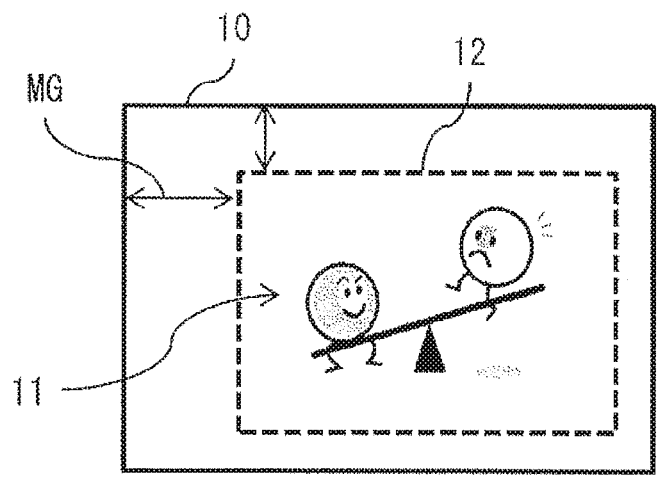

[ FIG. 1C ]
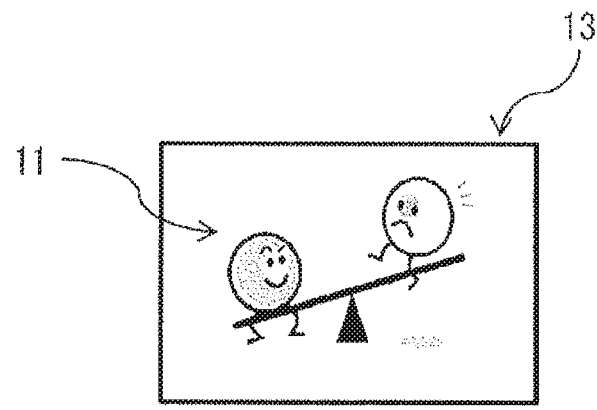

[FIG. 2A]
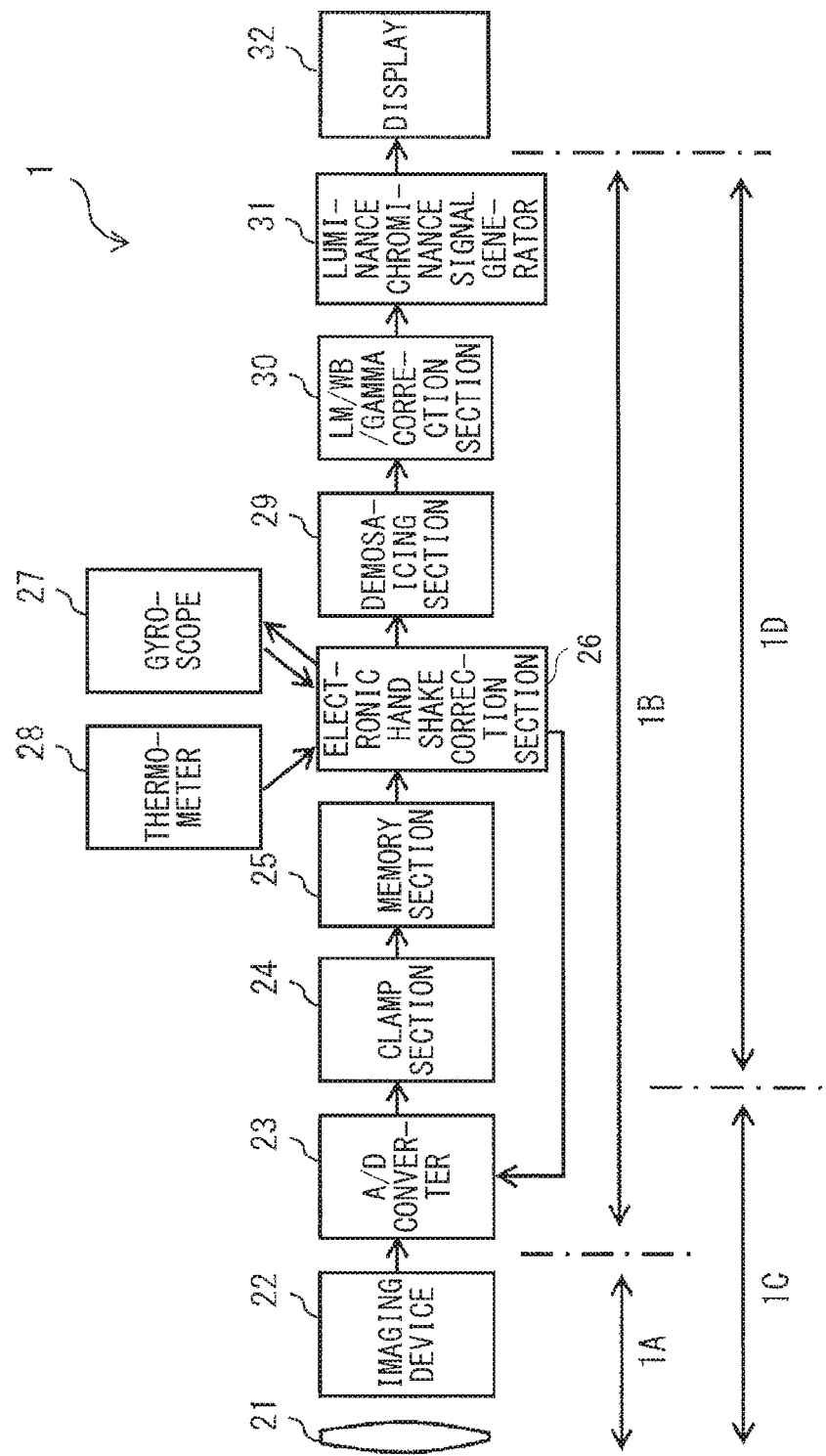

[ FIG. 2B ]
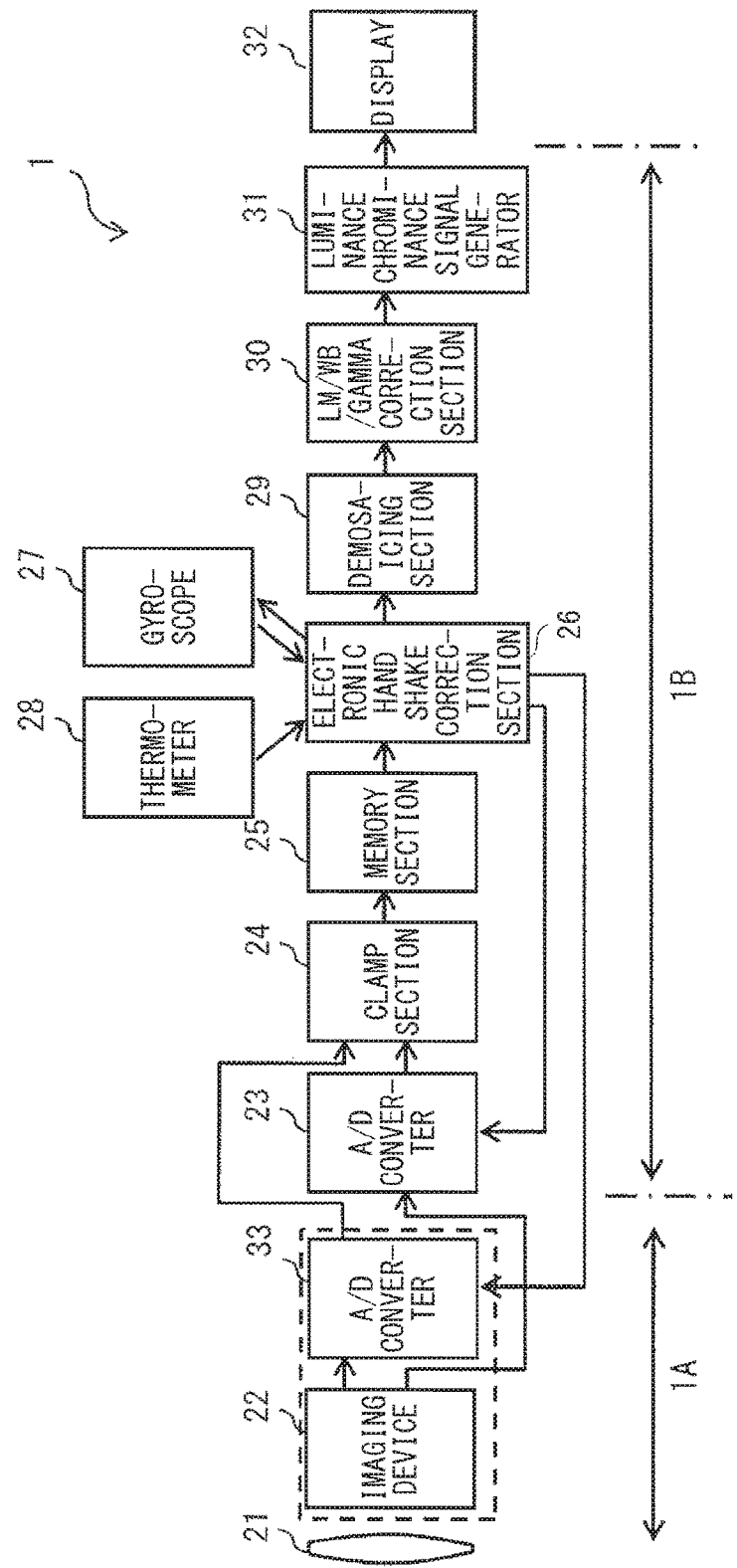

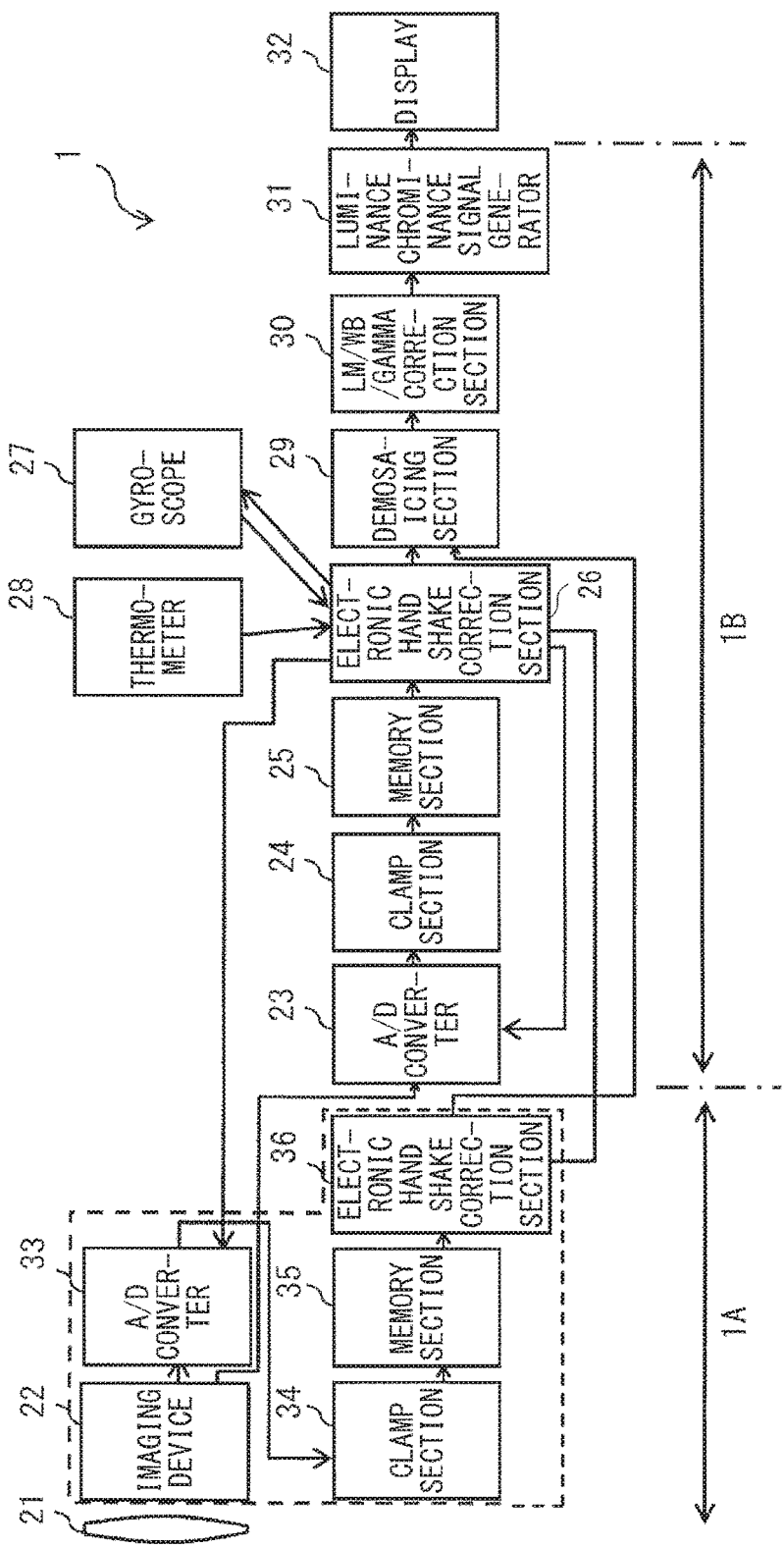
[FIG. 2C]

[FIG. 2D]
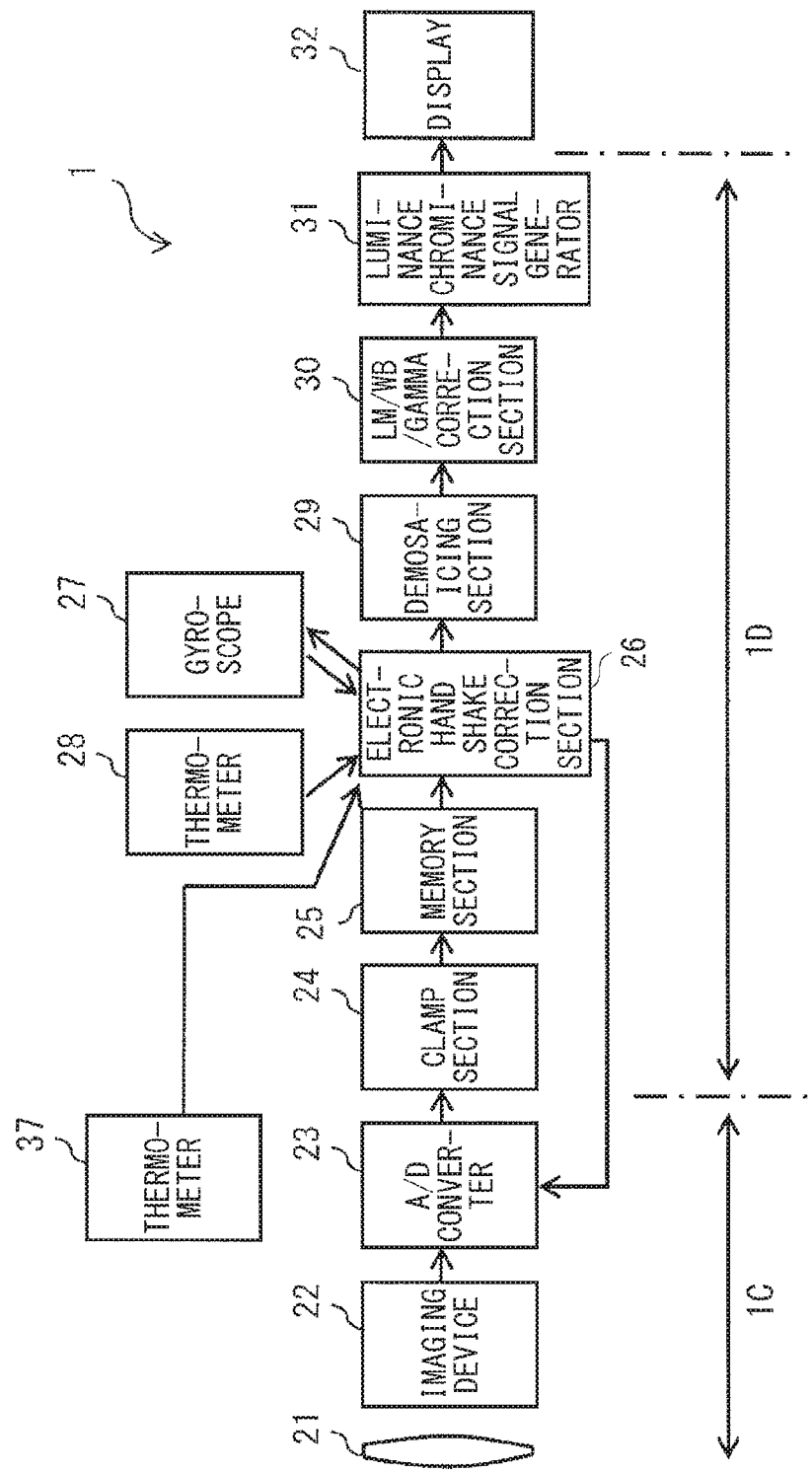

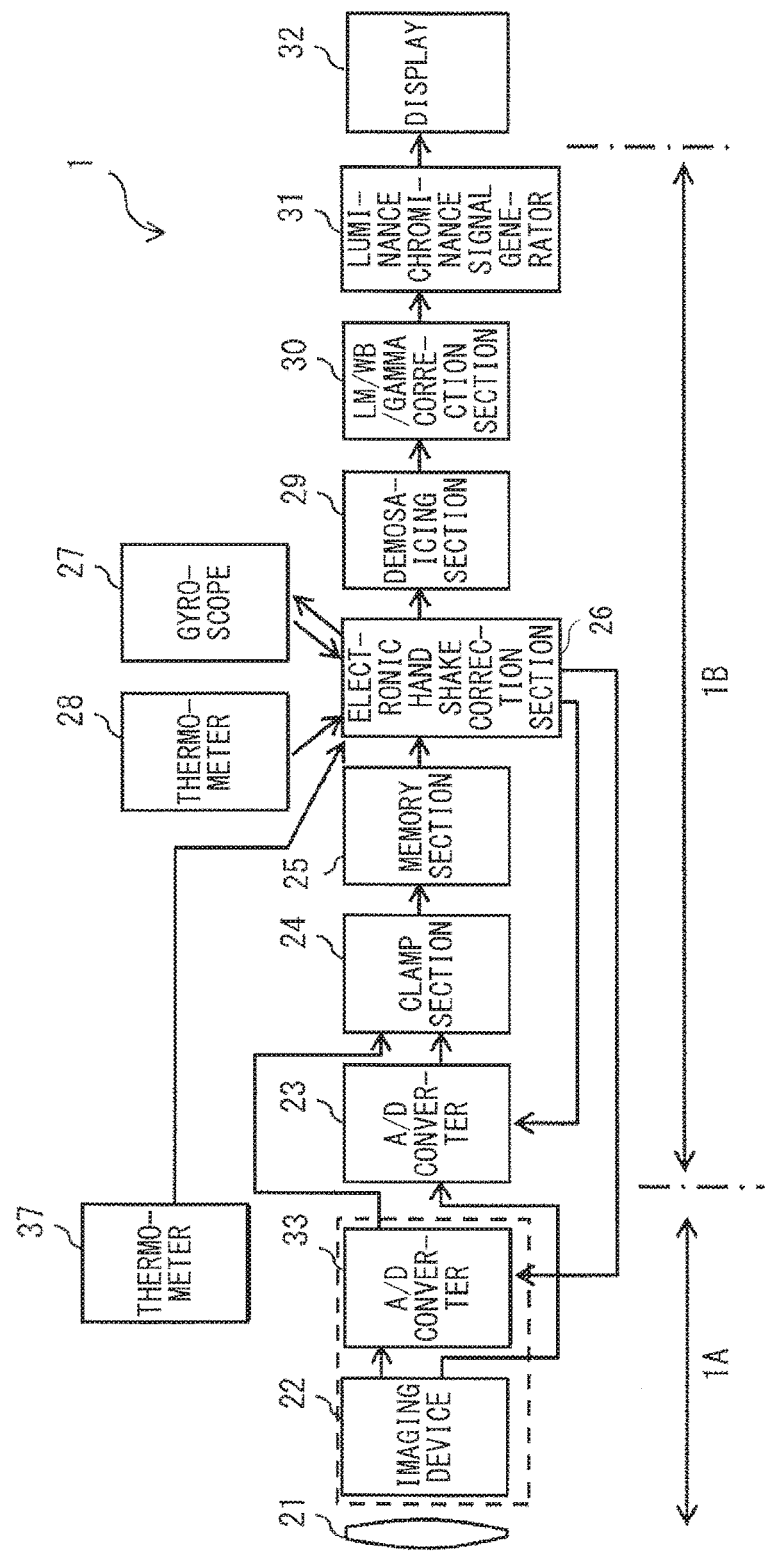
[FIG. 2E]

[ FIG. 2F ]
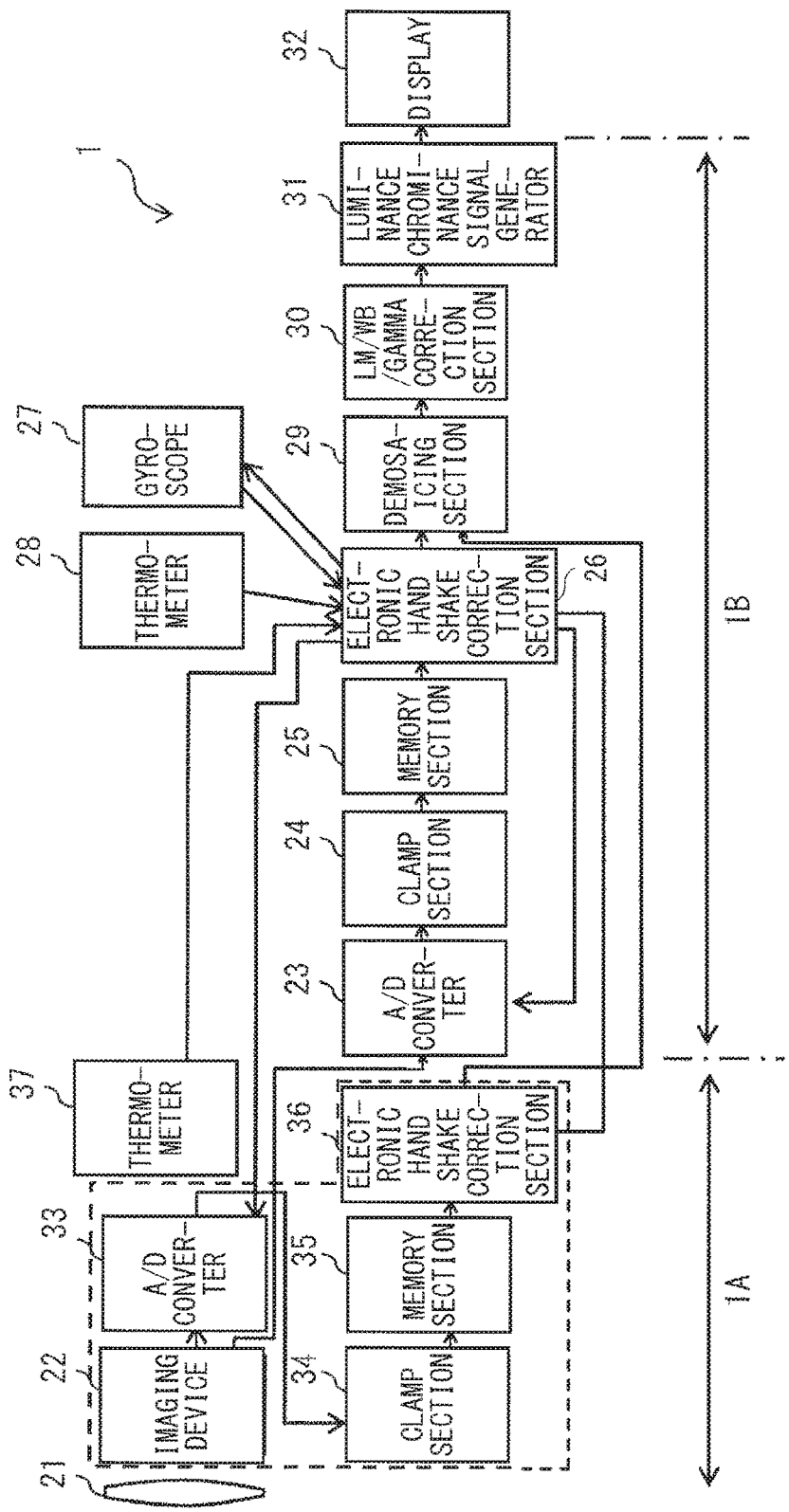

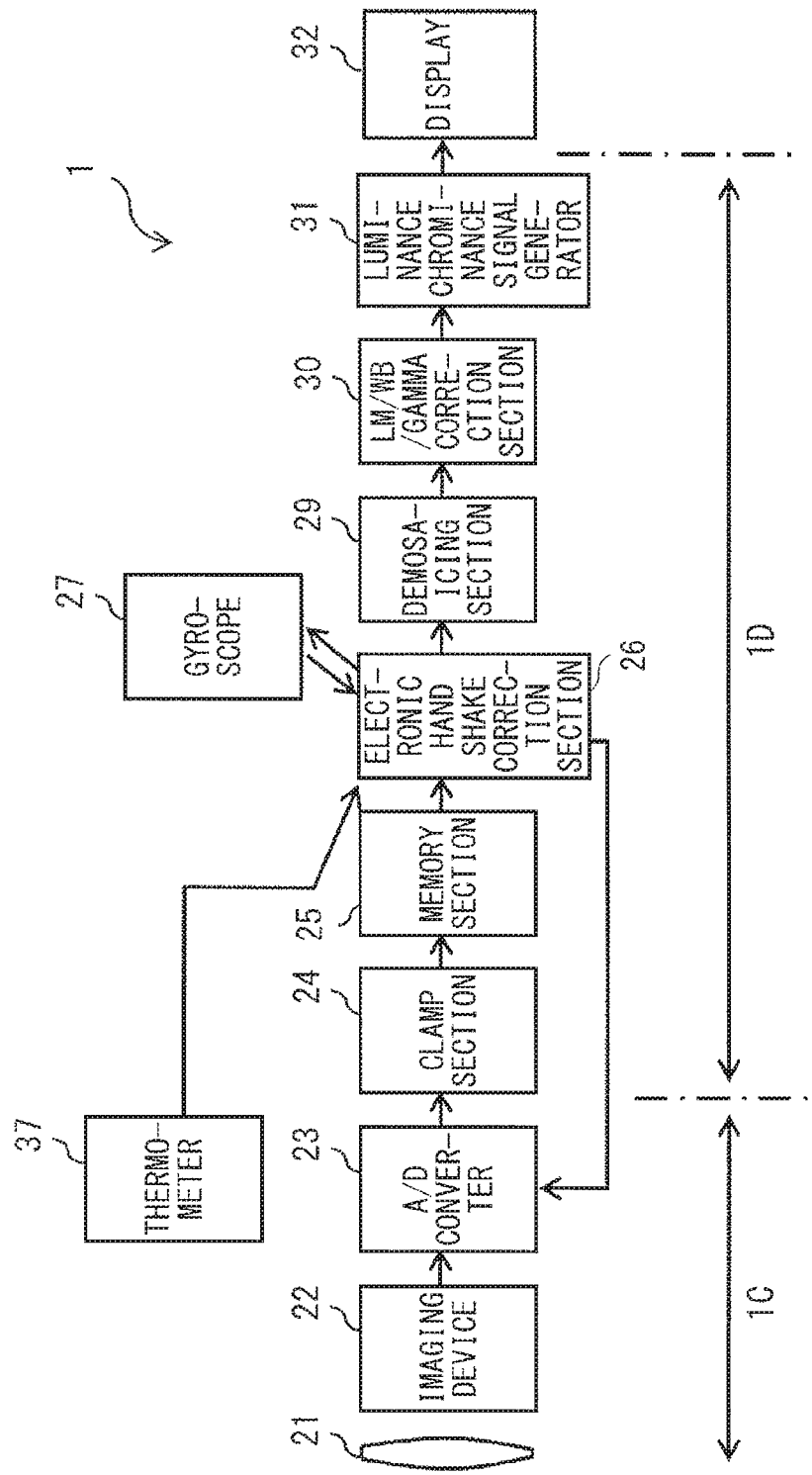
[FIG. 2G]

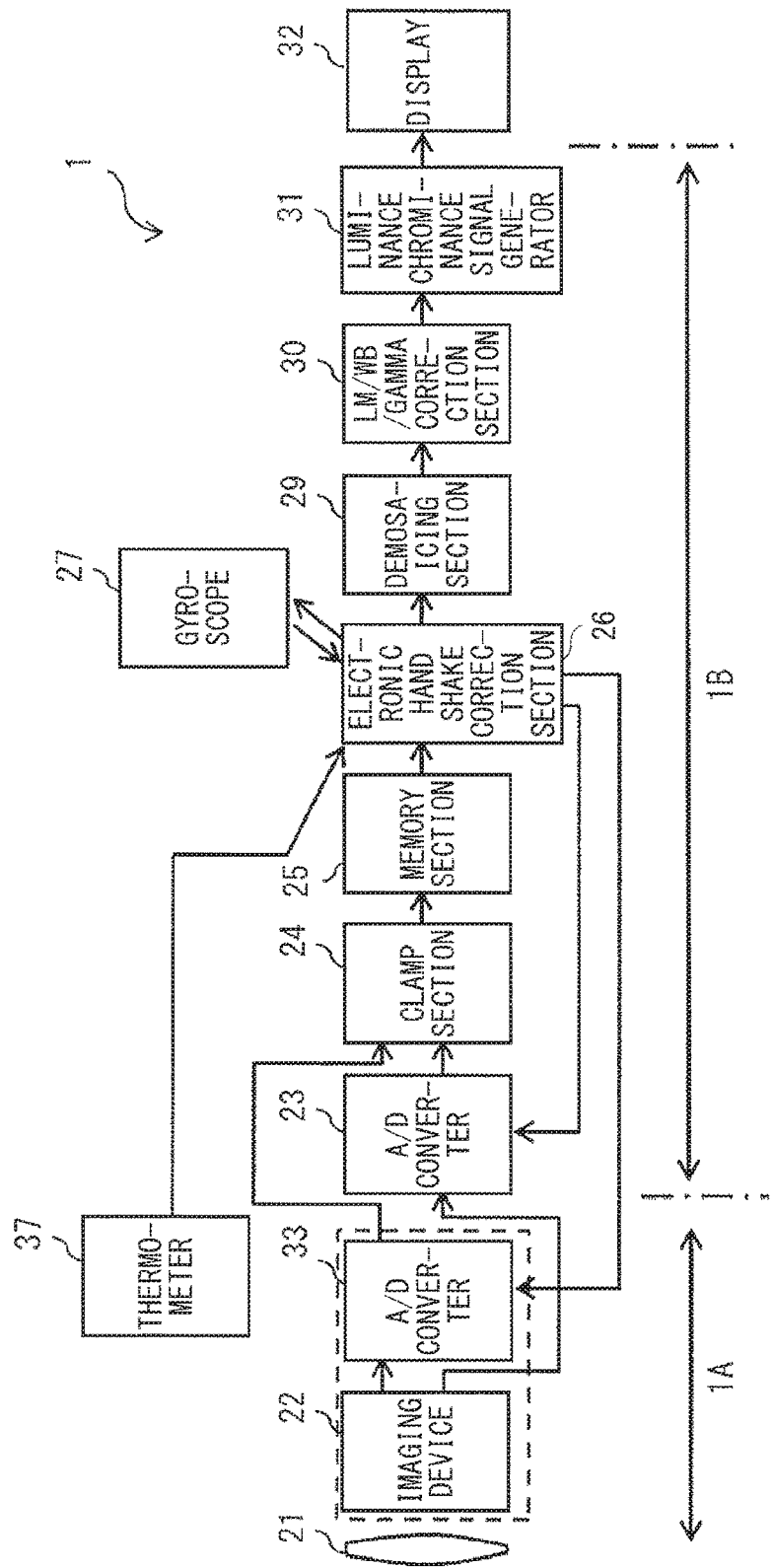
[FIG. 2H]

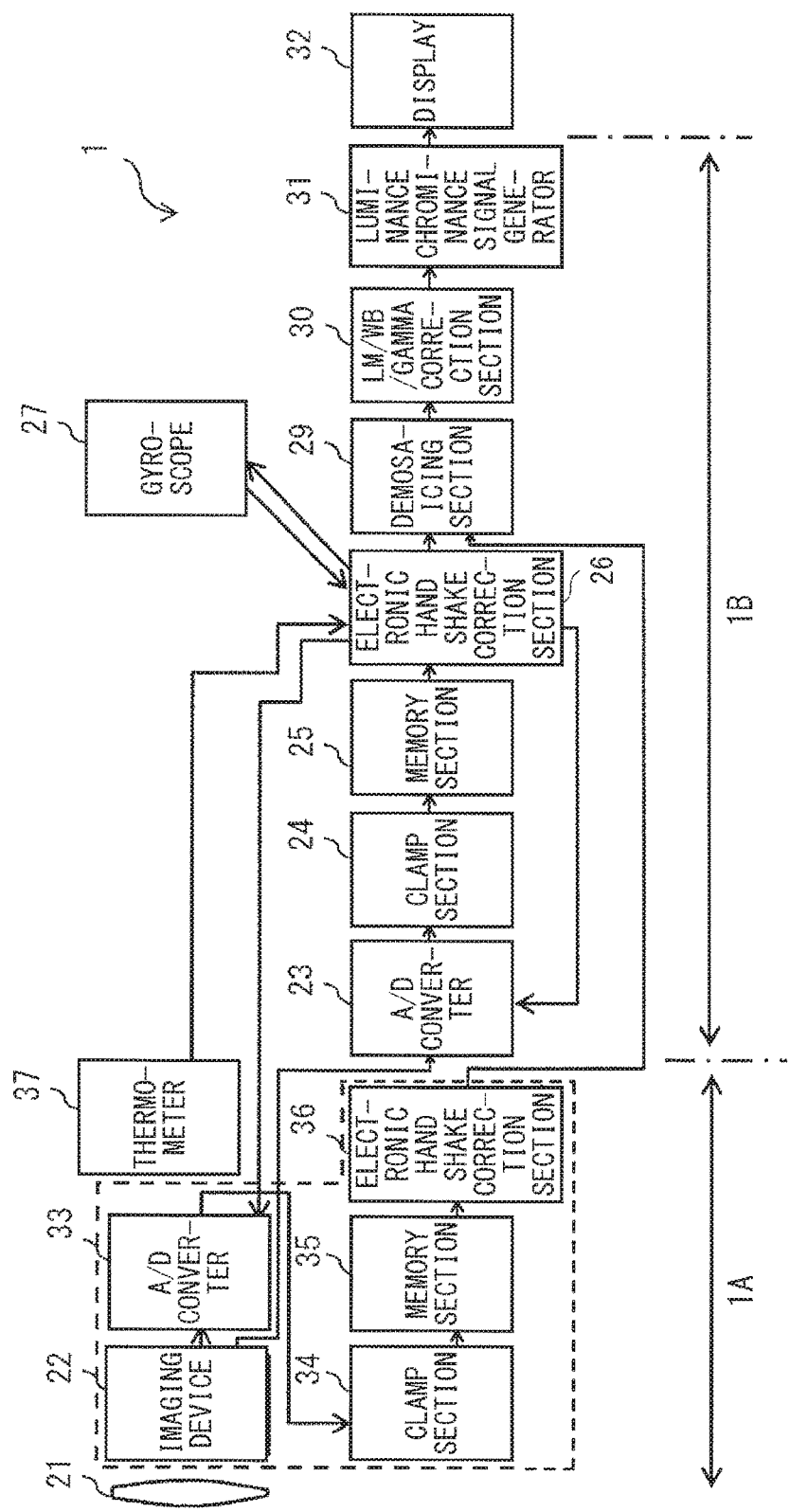
[FIG. 21]

[ FIG. 3 ]
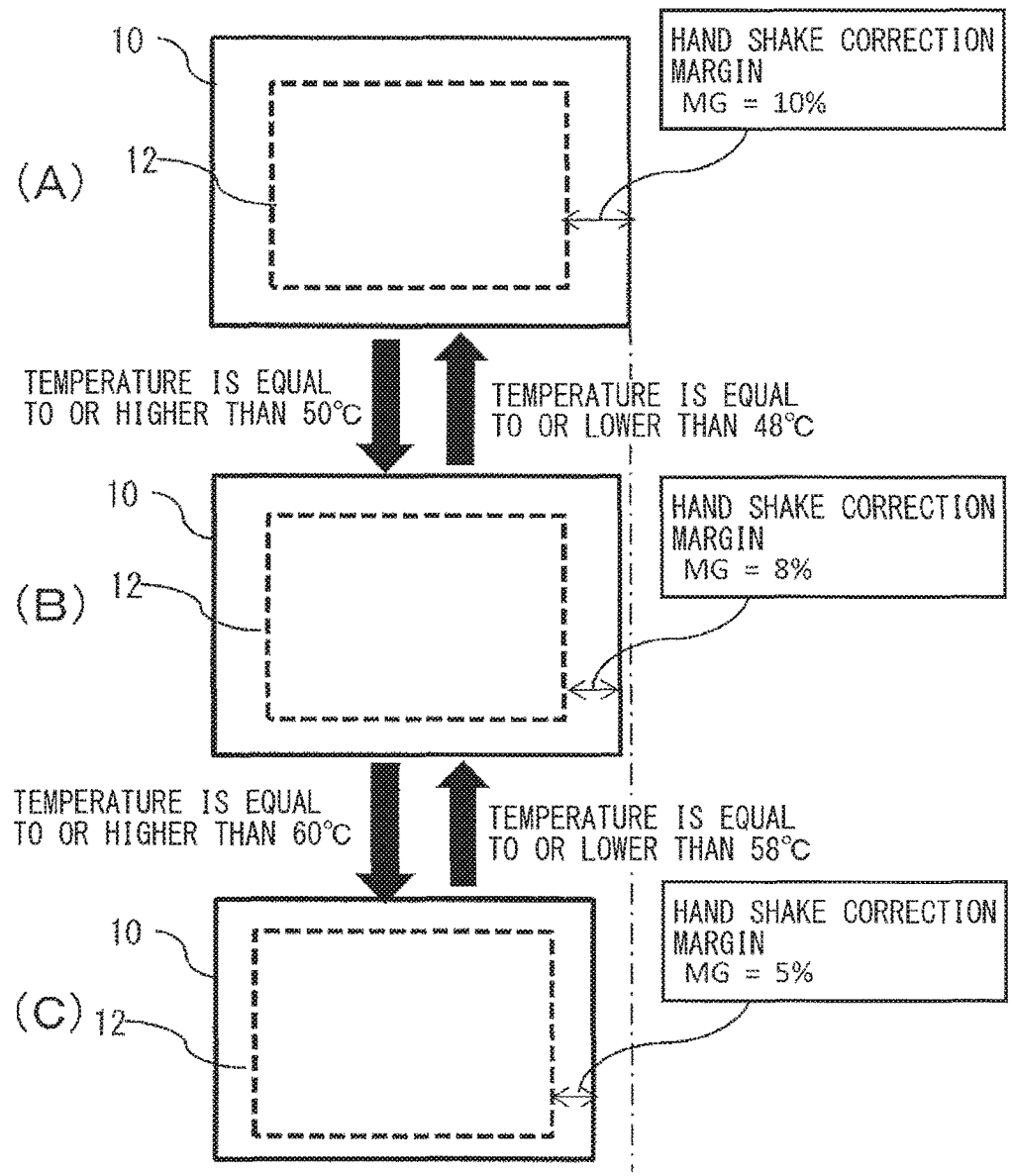

[ FIG. 4 ]
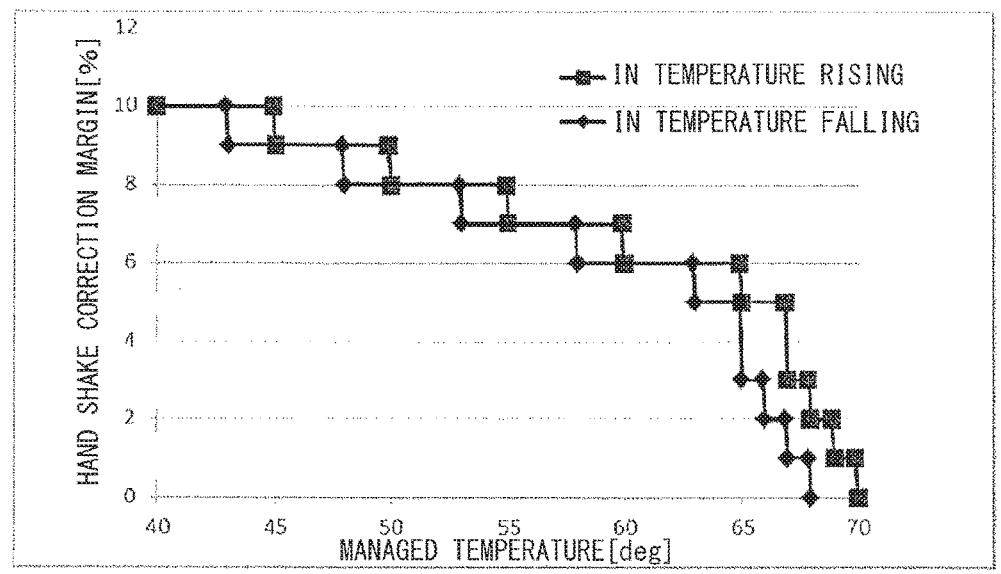
[ FIG. 5A ]
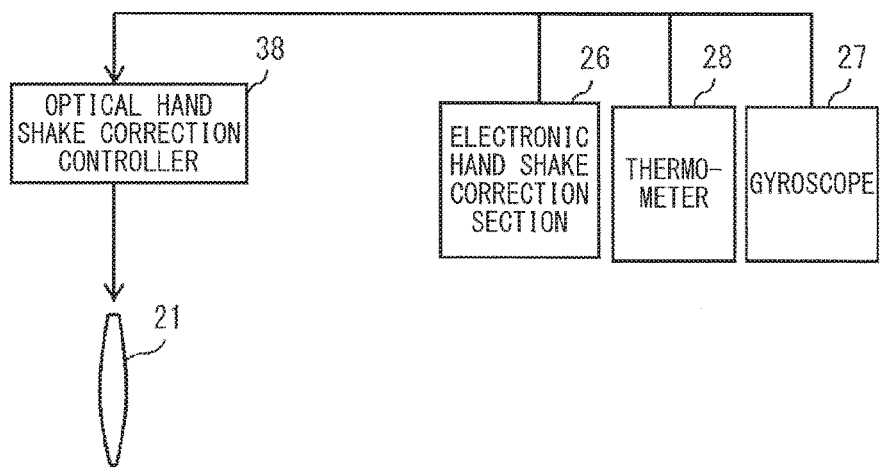

[ FIG. 5B ]
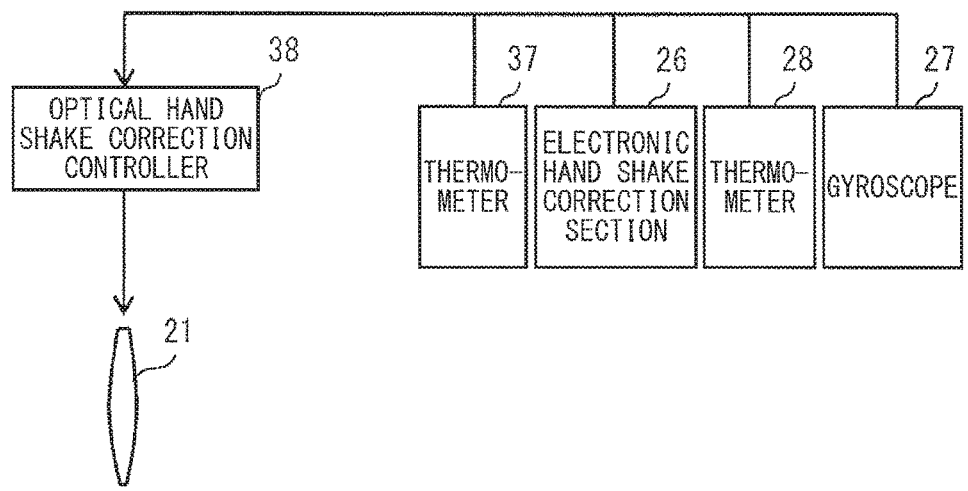
[ FIG. 5C ]
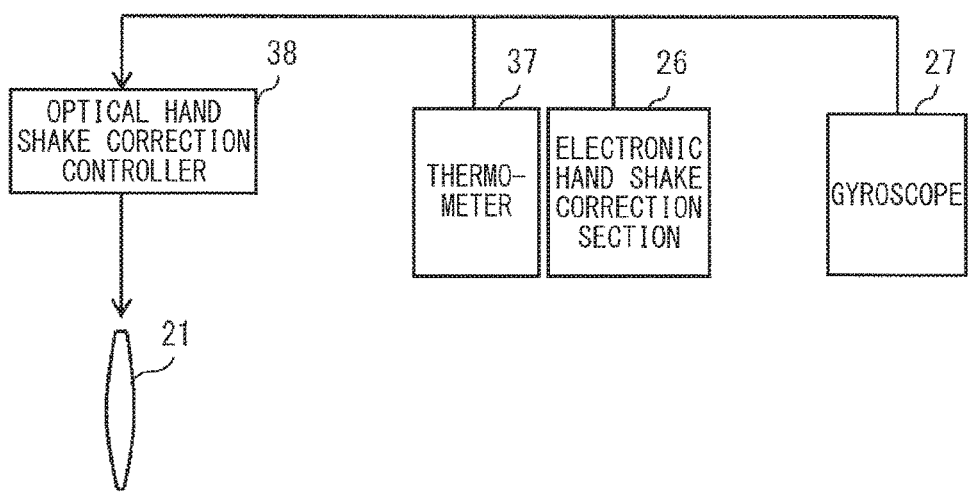

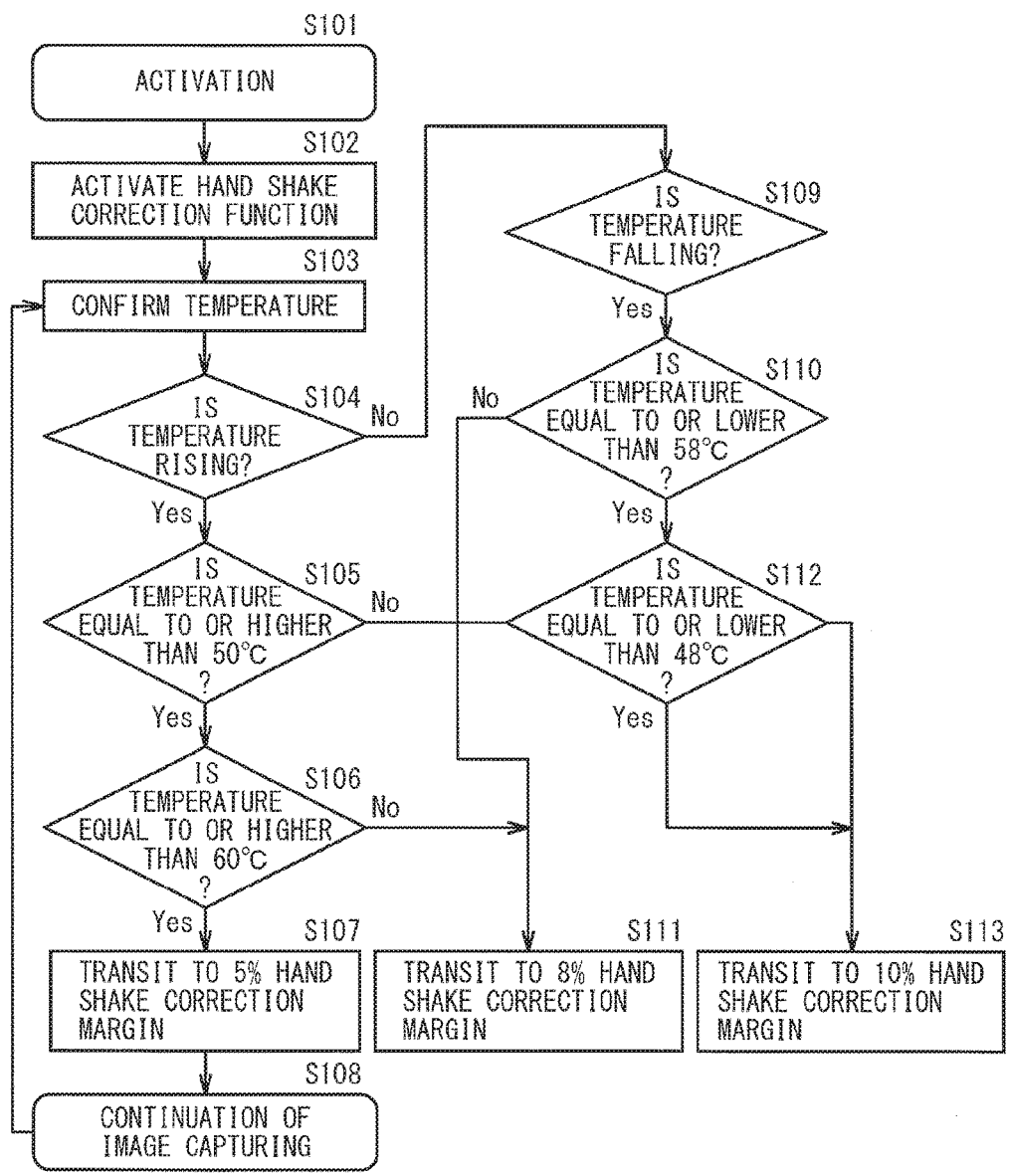
[FIG. 6]

[ FIG. 7 ]
(A) FREQUENCY OF ELECTRONIC HAND SHAKE CORRECTION A TIMES/SEC
TEMPERATURE IS EQUAL TO OR HIGHER THAN 50°C | TEMPERATURE IS EQUAL TO OR LOWER THAN 48°C
(B) FREQUENCY OF ELECTRONIC HAND SHAKE CORRECTION B TIMES/SEC     A > B > C
TEMPERATURE IS EQUAL TO OR HIGHER THAN 60°C | TEMPERATURE IS EQUAL TO OR LOWER THAN 58°C
(C) FREQUENCY OF ELECTRONIC HAND SHAKE CORRECTION C TIMES/SEC

[FIG. 8A]
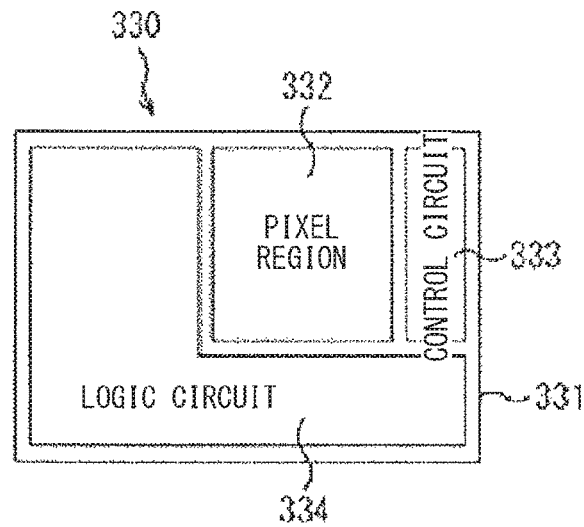
[FIG. 8B]
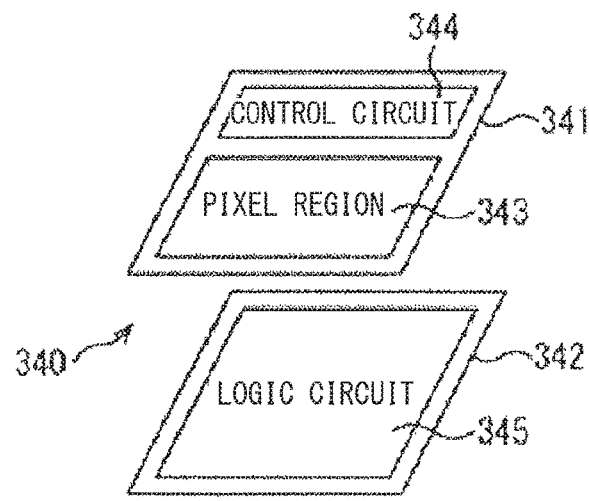
[FIG. 8C]
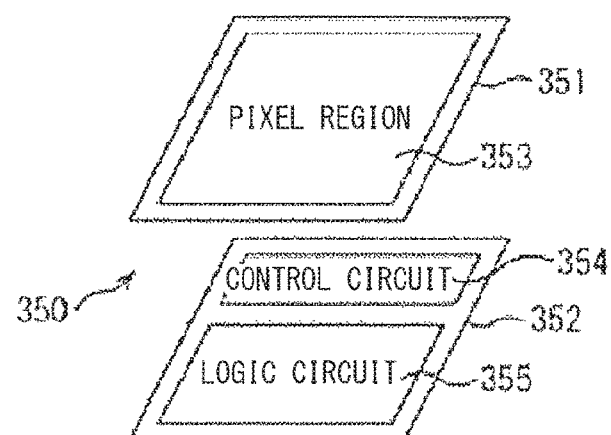

[ FIG. 9 ]
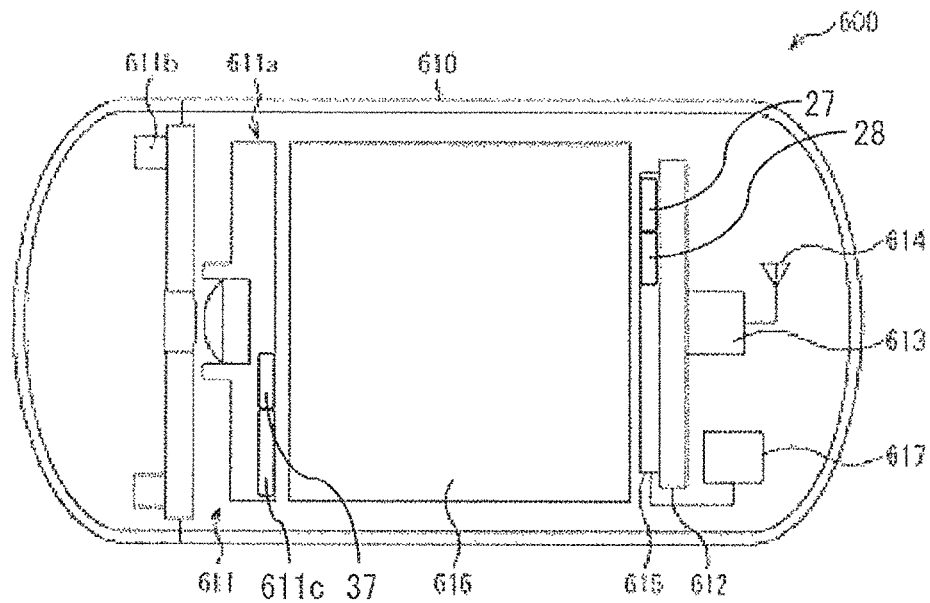
[ FIG. 10A ]
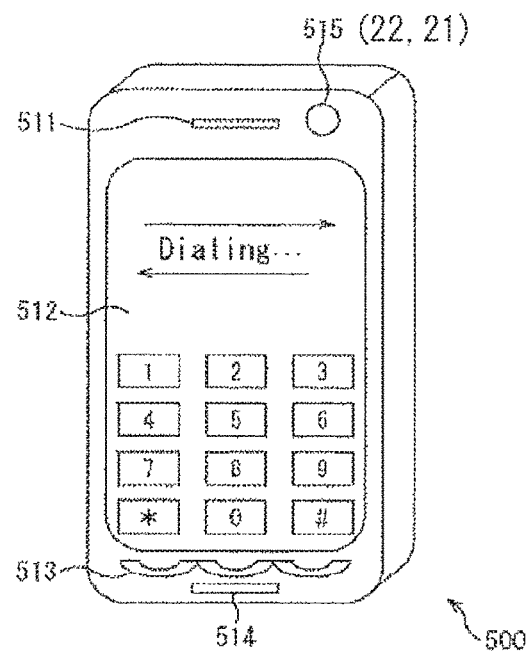

[ FIG. 10B ]
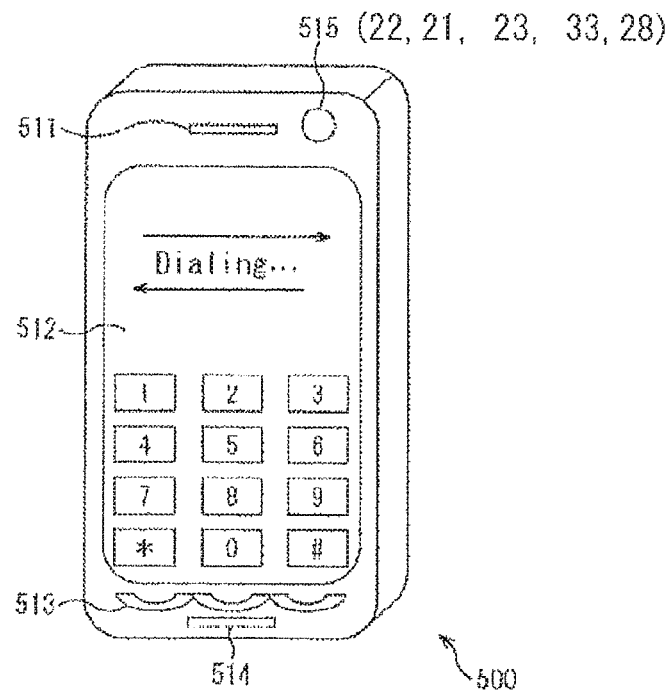
[ FIG. 10C ]
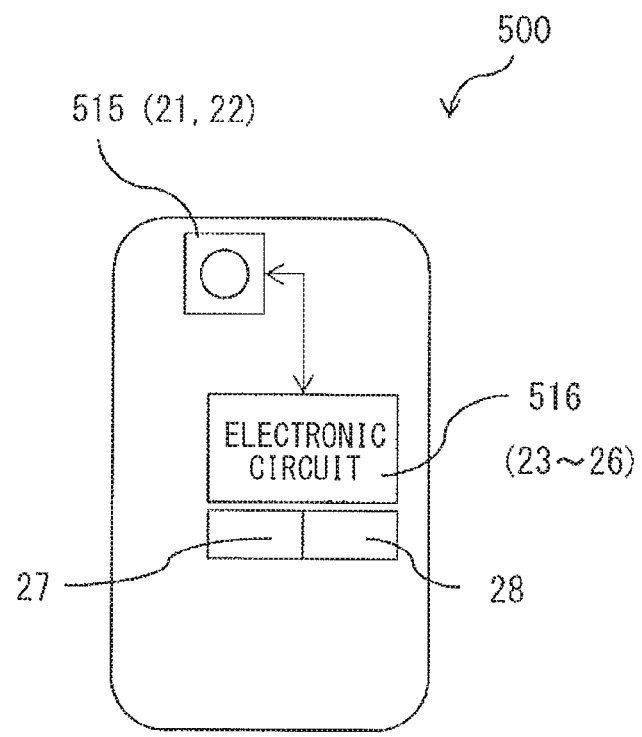

[ FIG. 10D ]
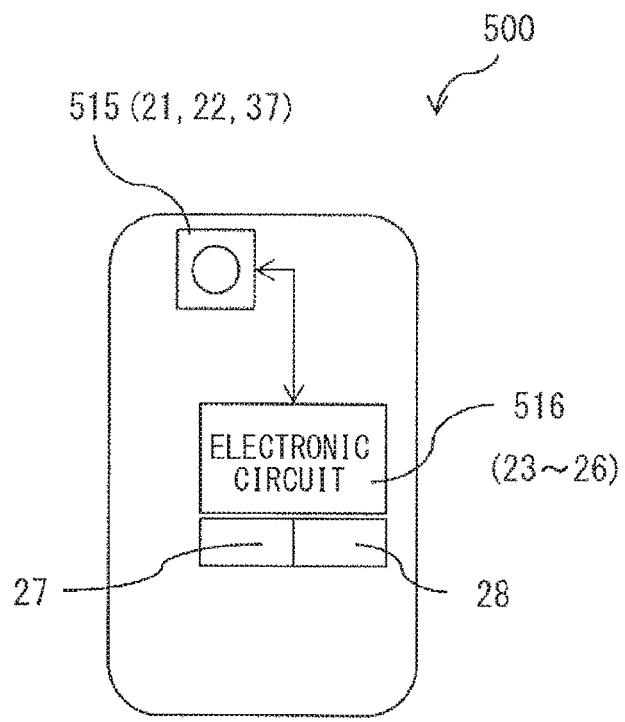
[ FIG. 10E ]
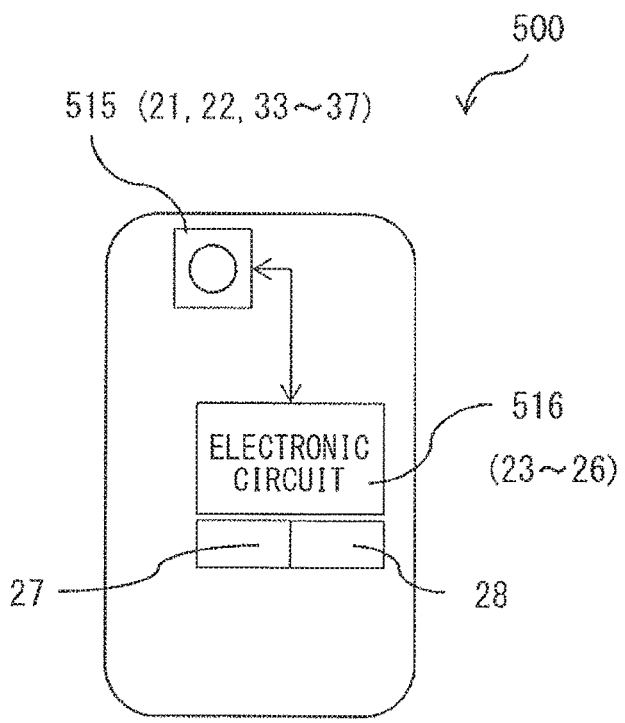

[ FIG. 11 ]
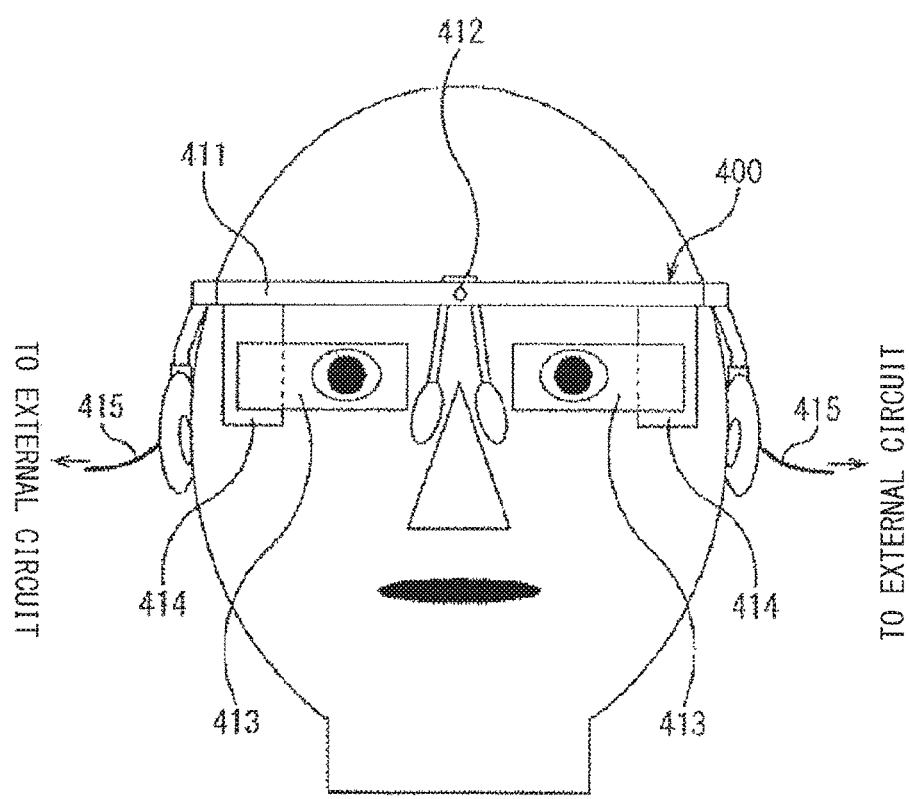

[ FIG. 12 ]
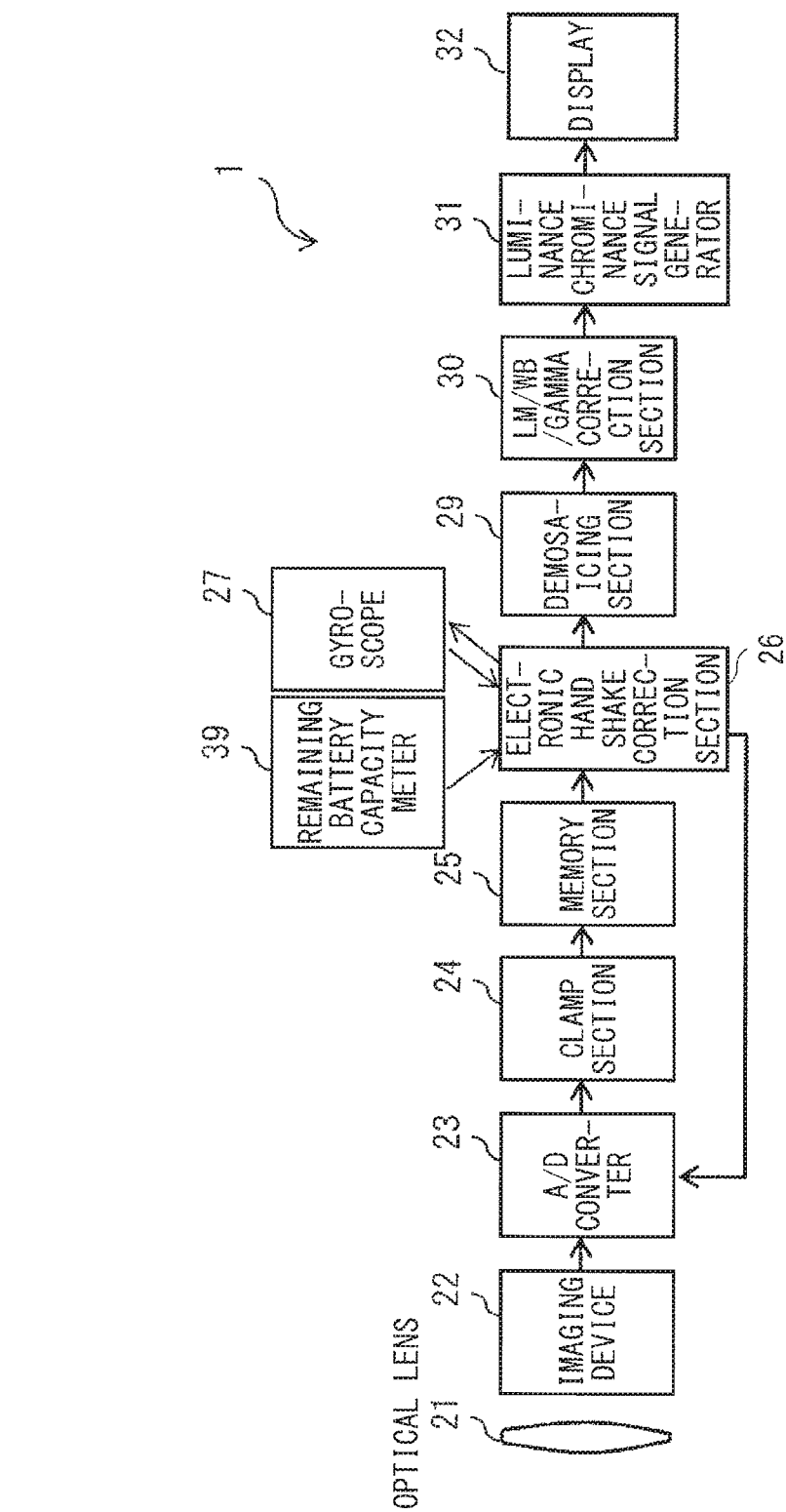

IMAGING UNIT AND ELECTRONIC APPARATUS INCLUDING THE SAME

CROSS REFERENCE TO RELATED APPLICATIONS

This application is a national stage application under 35 U.S.C. 371 and claims the benefit of PCT Application No. PCT/JP2016/060176 having an international filing date of 29 Mar. 2016, which designated the United States, which PCT application claimed the benefit of Japanese Patent Application No. 2015-095494 filed 8 May 2015, the disclosures of which are incorporated herein by reference in their entirety.

TECHNICAL FIELD

The present disclosure relates to an imaging unit and an electronic apparatus including the same.

BACKGROUND ART

In recent years, in an electronic apparatus such as a smartphone, heat generation in a terminal in which functions and circuits are integrated, is an issue. When the heat generation of the terminal exceeds a preset threshold, a specific operation may be turned off for operation guarantee reason or safety reason. For example, when the heat generation amount exceeds the threshold while a moving picture is captured by a camera, a camera function is turned off. This is a big issue in terms of usability of a user. Therefore, for example, PTL 1 proposes that only specific functions such as hand shake correction are turned on or off without turning off the camera operation.

CITATION LIST

Patent Literature

PTL 1: Japanese Unexamined Patent Application Publication No. 2001-296575

DISCLOSURE OF INVENTION

When the specific functions are turned on or off, bodily sensation of a user may be drastically changed disadvantageously. Such a disadvantage also occurs in a countermeasure against power consumption of the terminal, in addition to a countermeasure against the heat generation inside the terminal.

Thus, it is desirable to provide an imaging unit that makes it possible to reduce heat generation inside the terminal and power consumption of the terminal without drastically changing bodily sensation of a user, and an electronic apparatus including the imaging unit.

An imaging unit according to an embodiment of the disclosure includes: a detector that detects temperature or remaining battery capacity; an imaging device that obtains a captured image; and a correction section that changes, on a basis of a detection result of the detector, electronic hand shake correction accuracy with respect to the captured image obtained by the imaging device when an electronic hand shake correction function is enabled.

An electronic apparatus according to an embodiment of the disclosure includes the above-described imaging unit.

The imaging unit and the electronic apparatus according to the respective embodiments of the disclosure make it possible to change, on the basis of the detection result of the detector, the electronic hand shake correction accuracy with respect to the captured image obtained by the imaging device when the electronic hand shake correction is enabled. This makes it possible to provide natural bodily sensation of a user as compared with a case in which the electronic hand shake correction is abruptly turned on or off.

In the imaging unit and the electronic apparatus according to the respective embodiments of the disclosure, the electronic hand shake correction accuracy with respect to the captured image obtained by the imaging device is changed, on the basis of the detection result of the detector, when the electronic hand shake correction is enabled. This makes it possible to reduce heat generation inside the terminal and power consumption of the terminal without drastically changing bodily sensation of a user.

BRIEF DESCRIPTION OF DRAWINGS

FIG. 1A is a conceptual diagram to explain electronic hand shake correction.

FIG. 1B is a conceptual diagram to explain the electronic hand shake correction.

FIG. 1C is a conceptual diagram to explain the electronic hand shake correction.

FIG. 2A is a diagram illustrating an example of functional blocks of an imaging unit according to an embodiment of the disclosure.

FIG. 2B is a diagram illustrating an example of the functional blocks of the imaging unit according to the embodiment of the disclosure.

FIG. 2C is a diagram illustrating an example of the functional blocks of the imaging unit according to the embodiment of the disclosure.

FIG. 2D is a diagram illustrating an example of the functional blocks of the imaging unit according to the embodiment of the disclosure.

FIG. 2E is a diagram illustrating an example of the functional blocks of the imaging unit according to the embodiment of the disclosure.

FIG. 2F is a diagram illustrating an example of the functional blocks of the imaging unit according to the embodiment of the disclosure.

FIG. 2G is a diagram illustrating an example of the functional blocks of the imaging unit according to the embodiment of the disclosure.

FIG. 2H is a diagram illustrating an example of the functional blocks of the imaging unit according to the embodiment of the disclosure.

FIG. 2I is a diagram illustrating an example of the functional blocks of the imaging unit according to the embodiment of the disclosure.

FIG. 3 is a diagram illustrating an example of an algorithm of the electronic hand shake correction.

FIG. 4 is a diagram illustrating an example of the algorithm of the electronic hand shake correction.

FIG. 5A is a diagram illustrating some of components of an imaging unit that includes an optical hand shake correction controller.

FIG. 5B is a diagram illustrating some of components of the imaging unit that includes the optical hand shake correction controller.

FIG. 5C is a diagram illustrating some of components of the imaging unit that includes the optical hand shake correction controller.

FIG. 6 is a diagram illustrating an example of a procedure of the electronic hand shake correction.

FIG. 7 is a diagram illustrating an example of the algorithm of the electronic hand shake correction.

FIG. 8A is a diagram illustrating a configuration example in which an electronic circuit portion of the imaging unit is configured in a chip form.

FIG. 8B is a diagram illustrating a configuration example in which the electronic circuit portion of the imaging unit is configured in a chip form.

FIG. 8C is a diagram illustrating a configuration example in which the electronic circuit portion of the imaging unit is configured in a chip form.

FIG. 9 is a diagram illustrating a cross-sectional configuration example of a capsule endoscope on which the imaging unit is mounted.

FIG. 10A is a diagram illustrating a configuration example of a smartphone on which the imaging unit is mounted.

FIG. 10B is a diagram illustrating a configuration example of the smartphone on Which the imaging unit is mounted.

FIG. 10C is a diagram illustrating a configuration example of the smartphone on which the imaging unit is mounted.

FIG. 10D is a diagram illustrating a configuration example of the smartphone on which the imaging unit is mounted.

FIG. 10E is a diagram illustrating a configuration example of the smartphone on which the imaging unit is mounted.

FIG. 11 is a diagram illustrating an eyeglasses-type imaging apparatus on which the imaging unit is mounted.

FIG. 12 is a diagram illustrating an example of functional blocks of an imaging unit according to an embodiment of the disclosure.

MODES FOR CARRYING OUT THE INVENTION

Some embodiments of the disclosure are described in detail below with reference to drawings. Note that description is given in the following order.
1. Electronic hand shake correction (FIG. 1A to FIG. 1C)
2. Embodiment
Examples in which an imaging unit includes an electronic hand shake correction function (FIG. 2A to FIG. 6)
3. Modification
An example in which frequency of electronic hand shake correction is changed (FIG. 7)
4. Application examples to electronic apparatus
Application example 1: an example in which an imaging unit is configured in a chip form (FIG. 8A to FIG. 8C)
Application example 2: an example in which an imaging unit is applied to a capsule endoscope (FIG. 9)
Application example 3: an example in which an imaging unit is applied to a smartphone (FIG. 10A to FIG. 10E)
Application Example 4: an example in which an imaging unit is applied to an eyeglasses-type imaging apparatus (FIG. 11)
5. Common modification (FIG. 12)

<1. Electronic Hand Shake Correction>

A hand shake correction function is mounted in some of digital video cameras and digital still cameras. The types of the hand shake correction function are represented by an electronic type and an optical type. In electronic hand shake correction, hand shake (an amount and a direction of the hand shake) is detected from a comparison result of a plurality of images that are successively captured and a detection result of a gyro sensor, and a predetermined region including an object in an image outputted from an imaging device is moved in accordance with the detected hand shake to correct the hand shake. As a concept of the electronic hand shake correction, while the image outputted from the imaging device remains as it is, the object moves within the image outputted from the imaging device due to occurrence of hand shake; therefore, the predetermined region including the object moves, following the object, within the image outputted from the imaging device.

FIG. 1A and FIG. 1B are diagrams illustrating two consecutive captured images (original images 10) configuring a moving picture in which hand shake occurs. As illustrated in FIG. 1A and FIG. 1B, when the hand shake occurs, a position of an object 11 in the original image 10 is deviated. To correct the deviated position, a cutout region 12 is cut out from the entire region of the captured image (the original image 10) outputted from the imaging device. The cutout region 12 is moved in accordance with the hand shake (the amount and the direction of the hand shake) obtained from a comparison result of a plurality of captured images (the original images 10) successively captured and a detection result of the gyro sensor. This results in an image subjected to the electronic hand shake correction (a corrected image 13) as illustrated in FIG. 1C.

A movable range of the cutout region 12 corresponds to an electronic hand shake margin MG, and the size of the electronic hand shake margin MG serves as a parameter that defines a correction amount by the electronic hand shake correction.

<2. Embodiment>

Next, an imaging unit 1 according to an embodiment of the disclosure is described.

[Configuration]

FIG. 2A is a diagram illustrating an example of functional blocks of the imaging unit 1 according to the embodiment of the disclosure. The imaging unit 1 includes an optical lens 21, an imaging device 22, an A/D converter 23, a clamp section 24, a memory section 25, an electronic hand shake correction section 26, a gyroscope 27, and a thermometer 28. The imaging unit 1 further includes a demosaicing section 29, a linear matrix (LM)/white balance (WB)/gamma correction section 30, a luminance chrominance signal generator 31, and a display 32. The imaging unit 1 corresponds to a specific example of an "imaging unit" of the disclosure. The imaging device 22 corresponds to a specific example of an "imaging device" of the disclosure. The electronic hand shake correction section 26 corresponds to a specific example of a "first correction section" of the disclosure. The thermometer 28 corresponds to a specific example of a "detector" of the disclosure.

In the imaging unit 1, for example, the optical lens 21 and the imaging device 22 may configure one module 1A. Further, for example, the A/D converter 23, the clamp section 24, the memory section 25, the electronic hand shake correction section 26, the gyroscope 27, the thermometer 28, the demosaicing section 29, the LM/WB/gamma correction section 30, and the luminance chrominance signal generator 31 may configure one module 1B.

In the imaging unit 1, for example, the optical lens 21, the imaging device 22, and the A/D converter 23 may configure one module 1C. Further, for example, the clamp section 24, the memory section 25, the electronic hand shake correction section 26, the gyroscope 27, the thermometer 28, the demosaicing section 29, the LM/WB/gamma correction section 30, and the luminance chrominance signal generator 31 may configure one module 1D.

For example, the imaging unit 1 may include an A/D converter 33, as illustrated in FIG. 2B. In this case, for example, the optical lens 21, the imaging device 22, and the A/D converter 33 configure one module 1A in the imaging unit 1. Note that the A/D converter 33 may he incorporated in the imaging device 22. Further, for example, the A/D converter 23, the clamp section 24, the memory section 25, the electronic hand shake correction section 26, the gyroscope 27, the thermometer 28, the demosaicing section 29, the LM/WB/gamma correction section 30, and the luminance chrominance signal generator 31 may configure one module 1B. In this case, however, one of the A/D converter 23 and the A/D converter 33 is actually used because the modules 1A and 1B both include the A/D conversion function. The electronic hand shake correction section 26 may determine whether to use the A/D converter 23 or the A/D converter 33, on the basis of the detection result of the thermometer 28. For example, when a temperature of the module 1B detected by the thermometer 28 is higher than a predetermined temperature, the electronic hand shake correction section 26 may control the A/D converters 23 and 33 to cause the A/D converter 23 to stop the A/D conversion and to cause the A/D converter 33 to start the A/D conversion.

For example, the imaging unit 1 may include the A/D converter 33, a clamp section 34, a memory section 35, and an electronic hand shake correction section 36, as illustrated in FIG. 2C. In this case, in the imaging unit 1, for example, the optical lens 21, the imaging device 22, the A/D converter 33, the clamp section 34, the memory section 35, and the electronic hand shake correction section 36 may configure one module 1A. Note that the A/D converter 33, the clamp section 34, the memory section 35, and the electronic hand shake correction section 36 may be incorporated in the imaging device 22. In this case, however, one of a set of blocks from the A/D converter 23 to the electronic hand shake correction section 26 and a set of blocks from the A/D converter 33 to the electronic hand shake correction section 36 is actually used because the modules 1A and 1B both include the A/D conversion function and the hand shake correction function. The electronic hand shake correction section 26 may select the set to be used in the A/D conversion and the electronic hand shake correction, on the basis of the detection result of the thermometer 28. For example, when the temperature of the module 1B detected by the thermometer 28 is higher than the predetermined temperature, the electronic hand shake correction section 26 may control the A/D converters 23 and 33 to cause the module 1B to stop the A/D conversion and the electronic hand shake correction and to cause the module 1A to start the A/D conversion and the electronic hand shake correction.

For example, the imaging unit 1 may include a thermometer 37, in addition to the thermometer 28, as illustrated in FIG. 2D. In this case, the thermometer 37 may be mounted on the module 1C. In this case, however, it is assumed that control using the fact that a heat generation temperature of the module 1C is different from that of the module 1D is performed because the modules 1C and 1D both include a temperature measuring function. The electronic hand shake correction section 26 may select one of the A/D converter 23 and the electronic hand shake correction section 26 to reduce a calculation amount relating to the electronic hand shake correction, on the basis of a temperature of the module 1D detected by the thermometer 28 and a temperature of the module 1C detected by the thermometer 37.

Alternatively, for example, the imaging unit 1 may include the temperature sensor 37, in addition to the thermometer 28, as illustrated in FIG. 2E. In this case, the thermometer 37 may be mounted on the module 1A. In this case, however, it is assumed that control using the fact that a heat generation temperature of the module 1A is different from that of the module 1B is performed, because the modules 1A and 1B both include the temperature measurement function. The electronic hand shake correction section 26 may select one of the A/D converter 33 and the electronic hand shake correction section 26 to reduce the calculation amount relating to the electronic hand shake correction, on the basis of the temperature of the module 1B detected by the thermometer 28 and a temperature of the module 1A detected by the thermometer 37. Moreover, the electronic hand shake correction section 26 may determine whether to use the A/D converter 23 or the A/D converter 33, on the basis of the temperature of the module 1B detected by the thermometer 28 and the temperature of the module 1A detected by the thermometer 37. For example, when the temperature of the module 1B detected by the thermometer 28 is higher than the predetermined temperature and the temperature of the module 1A detected by the thermometer 37 is lower than the predetermined temperature, the electronic hand shake correction section 26 may control the A/D converters 23 and 33 to cause the A/D converter 23 to stop the A/D conversion and to cause the A/D converter 33 to start, the A/D conversion.

Alternatively, for example, the imaging unit 1 may include the thermometer 37, in addition to the thermometer 28, as illustrated in FIG. 2F. In this case, the thermometer 37 may he mounted on the module 1A. In this case, however, it is assumed that the control using the fact that the heat generation temperature of the module 1A is different from that of the module 1B is performed because the modules 1A and 1B both include the temperature measurement function. The electronic hand shake correction section 26 may select one of the set of the blocks from the A/D converter 23 to the electronic hand shake correction section 26 and the set of the blocks from the A/D converter 33 to the electronic hand shake correction section 36 to be used in the A/D conversion and the electronic hand shake correction, on the basis of the temperature of the module 1B detected by the thermometer 28 and the temperature of the module 1A detected by the thermometer 37. For example, when the temperature of the module 1B detected by the thermometer 28 is higher than the predetermined temperature and the temperature of the module 1A detected by the thermometer 37 is lower than the predetermined temperature, the electronic hand shake correction section 26 may control the A/D converters 23 and 33 to cause the set of the blocks from the A/D converter 23 to the electronic hand shake correction section 26 to stop the A/D conversion and the electronic hand shake correction and to cause the set of the blocks from the A/D converter 33 to the electronic hand shake correction section 36 to start the A/D conversion and the electronic hand shake correction.

For example, the imaging unit 1 may include the thermometer 37 in place of the thermometer 28, as illustrated in FIG. 2G. In this case, the thermometer 37 may be mounted on the module 1C. The electronic hand shake correction section 26 may select one of the A/D converter 23 and the electronic hand shake correction section 26 to reduce the calculation amount relating to the electronic hand shake correction, on the basis of the temperature of the module 1C detected by the thermometer 37.

Alternatively, for example, the imaging unit 1 may include the thermometer 37 in place of the thermometer 28, as illustrated in FIG. 2H. In this case, the thermometer 37 may be mounted on the module 1A. The electronic hand shake correction section 26 may select one of the A/D converter 33 and the electronic hand shake correction 26 to reduce the calculation amount relating to the electronic hand shake correction, on the basis of the temperature of the module 1A detected by the thermometer 37. Further, the electronic hand shake correction section 26 may determine whether to use the A/D converter 23 or the A/D converter 33, on the basis of the temperature of the module 1A detected by the thermometer 37. For example, when the temperature of the A/D converter 33 detected by the thermometer 37 is higher than a predetermined temperature, the electronic hand shake correction section 26 may control the A/D converters 23 and 33 to cause the A/D converter 33 to stop the A/D conversion and to cause the A/D converter 23 to start the A/D conversion.

Alternatively, for example, the imaging unit 1 may include the thermometer 37 in place of the thermometer 28, as illustrated in FIG. 2I. In this case, the thermometer 37 may be mounted on the module 1A. In this case, however, it is assumed that control using the heat generation temperature of the module 1A is performed because the module 1 A includes the temperature measurement function. The electronic hand shake correction section 26 may select one of the set of the blocks from the A/D converter 23 to the electronic hand shake correction section 26 and the set of the blocks from the A/D converter 33 to the electronic hand shake correction section 36 to be used in the A/D conversion and the electronic hand shake connection, on the basis of the temperature of the module 1A detected by the thermometer 37. For example, when the temperature of the module 1A detected by the thermometer 37 is higher than the predetermined temperature, the electronic hand shake correction section 26 may control the A/D converters 23 and 33 to cause the set of the blocks from the A/D converter 3 3 to the electronic hand shake correction section 36 to stop the A/D conversion and the electronic hand shake correction and to cause the set of the blocks from the A/D converter 23 to the electronic hand shake correction section 26 to start the A/D conversion and the electronic hand shake correction.

The optical lens 21 adjusts a focal length of object light that enters the imaging device 22. The specific configuration of the optical lens 21 is optional. For example, the optical lens 21 may be configured of a plurality of lenses. The object light that has passed through the optical lens 21 may enter the imaging device 22 through, for example, an IR cut filter that allows light other than infrared light to pass therethrough. The imaging device 22 acquires the captured image (the original image 10). The imaging device 22 provides the acquired captured image (the original image 10) to the A/D converters 23 and 33. The imaging device 22 converts the object light into an electric signal by a pixel unit, and supplies the electric signal to the A/D converters 23 and 33. For example, the imaging device 22 may include a pixel array section and a peripheral circuit section on a silicon substrate. The pixel array section may be configured of a plurality of imaging pixels arranged in a matrix, and the peripheral circuit section may drive the pixel array section. For example, each of the imaging pixels may include, for example, a photodiode serving as a photoelectric conversion element and a plurality of pixel transistors (so-called MOS transistors).

The A/D converters 23 and 33 each convert an electric signal (an analog signal) of RGB (namely, the captured image (the original image 10)) supplied from the imaging device 22 into digital data (pixel data). The A/D converters 23 and 33 respectively supply the digital pixel data (RAW data) to the clamp sections 24 and 34. The clamp sections 24 and 34 subtract a black level that is a level determined as black, from the pixel data provided respectively from the A/D converters 23 and 34. Thereafter, the clamp sections 24 and 34 respectively provide the pixel data (a pixel value) subjected to the black level subtraction, to the memory sections 25 and 35. The memory sections 25 and 35 temporarily hold the pixel data provided respectively from the clamp sections 24 and 34. The gyroscope 27 detects displacement and rotation of the imaging unit 1. The gyroscope 27 detects displacement and rotation of the imaging unit 1 continuously or with a predetermined sampling cycle, and provides detection results to the electronic hand shake correction section 26. The thermometers 28 and 37 each detect a temperature inside the imaging unit 1. The thermometers 28 and 37 each detect the temperature inside the imaging unit 1 continuously or with a predetermined sampling cycle, and output a detection result to the electronic hand shake correction section 26. When the thermometer 28 is disposed near the A/D converter 23 or the electronic hand shake correction section 26, the thermometer 28 detects the temperature of the A/D converter 23 or the electronic hand shake correction section 26. When the thermometer 37 is disposed near the A/D converter 33 or the electronic hand shake correction section 36, the thermometer 37 detects the temperature of the A/D converter 33 or the electronic hand shake correction section 36.

The demosaicing section 29 performs a demosaicing process on the pixel data provided from the electronic hand shake correction section 26, thereby converting the pixel data into RGB data through complement of color information and other processes. The demosaicing section 29 provides the image data subjected to the demosaicing process to the LM/WB/gamma correction section 30. The LM/WB/gamma correction section 30 performs color characteristic correction on the image data provided from the demosaicing section 29. More specifically, to fill differences between chromaticity points of primary colors (RGB) defined in accordance with standards and chromaticity points of an actual camera, the LM/WB/gamma correction section 30 performs processing in which each color signal of the image data is corrected with use of a matrix coefficient to change color reproducibility. Further, the LM/WB/gamma correction section 30 sets a gain with respect to while for a value of each channel of the image data, thereby adjusting white balance. Moreover, the LM/WB/gamma correction section 30 adjusts relative relationship between the colors of the image data and output device characteristics to perform gamma correction in order to obtain display closer to an original. The LM/WB/gamma correction section 30 provides the corrected image data to the luminance chrominance signal generator 31.

The luminance chrominance signal generator 31 generates a luminance signal (Y) and color difference signals (Cr and Cb) from the image data provided from the LM/WB/gamma correction section 30. The luminance chrominance signal generator 31 generates luminance chrominance signal (V, Cr, and Cb), and then provides the luminance signal and the color difference signals to the display 32. The display 32 displays an image based on the image data (the luminance chrominance signals) provided from the luminance chrominance signal generator 31. In other words, the display 32 displays a moving picture or a still image captured by the imaging device 22. The display 32 may include, for example, a liquid crystal display (LCD) or an organic electroluminescence (EL) display.

Next, description is given of the electronic hand shake correction sections 26 and 36. The electronic hand shake correction section 26 changes, on the basis of the detection result of the thermometer 28 or the thermometer 37 or both, electronic hand shake correction accuracy with respect to the captured image (the original image 10) obtained by the imaging device 22 when the electronic hand shake correction function is enabled. The original image 10 corresponds to a specific example of a "captured image" of the disclosure. The phrase of "the electronic hand shake correction function is enabled" indicates that the electronic hand shake correction is being performed or the electronic hand shake correction is to be performed, and does not indicate whether an effect of the electronic hand shake correction is effective. For example, the term "electronic hand shake correction accuracy" may indicate a concept relating to position fluctuation of the object 11 in a plurality of corrected images 13 that are obtained by performing the electronic hand shake correction on a plurality of captured images (original images 10) successively captured.

The electronic hand shake correction accuracy correlates with the size of the hand shake correction margin MG. When the hand shake correction margin MG is large, it is possible to largely shift the cutout region 12 within the captured image (the original image 10) as the size of the hand shake correction margin MG increases. Therefore, when the hand shake correction margin MG is large, it is possible to enhance the electronic hand shake correction accuracy. The calculation amount necessary for the hand shake correction, however, increases as the hand shake correction margin MG increases. The calculation amount correlates with the power consumption, and also correlates with the heat generation amounts of the modules 1A to 1D caused by the power consumption. Accordingly, when the hand shake correction margin MG is large, the power consumption is large and the heat generation amounts of the modules 1A to 1D are also large.

in contrast, when the hand shake correction margin MG is small, the maximum value of the shift amount of the cutout region 12 within the captured image (the original image 10) becomes small as the hand shake correction margin MG decreases. In this case, the shill amount of the cutout region 12 within the captured image (the original image 10) may be within the hand shake correction margin MG. To largely shift the cutout region 12 within the captured image (the original image 10), however, the shift amount may not be within the hand shake correction margin MG, and the shift amount may be limited. In this case, it is difficult to sufficiently eliminate the hand shake by the electronic hand shake correction. Thus, the electronic hand shake correction accuracy easily becomes low when the hand shake correction margin MG is small. The calculation amount necessary for the hand shake correction, however, decreases as the hand shake correction margin MG decreases. Therefore, when the hand shake correction margin MG is small, the power consumption is small and the heat generation amounts of the modules 1A to 1D are also small.

It is found from the above description that changing the hand shake correction margin MG changes the power consumption and the heat generation amounts of the modules 1A to 1D, in addition to the electronic hand shake correction accuracy. In other words, it is found that changing the hand shake correction margin MG is one of methods of changing the power consumption and the heat generation amounts of the modules 1A to 1D. Thus, the electronic hand shake correction sections 26 and 36 may use the hand shake correction margin MG as a variable parameter to change the power consumption and the heat generation amounts of the modules 1A to 1D.

More specifically, in FIG. 2A and FIG. 2B, the electronic hand shake correction section 26 may change the size of the hand shake correction margin MG when the region including the object 11 is cut out from the captured image (the original image 10), on the basis of the detection result of the thermometer 28. In FIG. 2C, the electronic hand shake correction sections 26 and 36 may change the size of the hand shake correction margin MG when the region including the object 11 is cut out from the captured image (the original image 10), on the basis of the detection result of the thermometer 28. The electronic hand shake correction section 36 may directly receive the detection result of the thermometer 28 from the thermometer 28, or may receive the detection result of the thermometer 28 through the electronic hand shake correction section 26 as illustrated in FIG. 2C.

Moreover, in FIG. 2D and FIG. 2E, the electronic hand shake correction section 26 may change the size of the hand shake correction margin MG when the region including the object 11 is cut out from the captured image (the original image 10), on the basis of the detection results of the thermometer 28 and the thermometer 37. In FIG. 2F, the electronic hand shake correction sections 26 and 36 may change the size of the hand shake correction margin MG when the region including the object 11 is cut out from the captured image (the original image 10), on the basis of the detection results of the thermometer 28 and the thermometer 37. The electronic hand shake correction section 36 may directly receive the detection result of the thermometer 28 from the thermometer 28, or may receive the detection result of the thermometer 28 through the electronic hand shake correction section 26 as illustrated in FIG. 2F.

Further, in FIG. 2G and FIG. 2H, the electronic hand shake correction section 26 may change the size of the hand shake correction margin MG when the region including the object 11 is cut out from the captured image (the original image 10), on the basis of the detection result of the thermometer 37. In FIG. 2I, the electronic hand shake correction sections 26 and 36 may change the size of the hand shake correction margin MG when the region including the object 11 is cut out from the captured image (the original image 10), on the basis of the detection result of the thermometer 37. The electronic hand shake correction section 36 may directly receive the detection result of the thermometer 37 from the thermometer 28, or may receive the detection result of the thermometer 37 through the electronic hand shake correction section 26 as illustrated in FIG. 2I.

Incidentally, to change the size of the hand shake correction margin MG, for example, the number of pixels of the captured image (the original image 10) may be changed. Therefore, in FIG. 2A and FIG. 2B, the electronic hand shake correction section 26 may change the number of pixels of the captured image (the original image 10), on the basis of the detection result of the thermometer 28. Further, in FIG. 2C, the electronic hand shake correction sections 26 and 36 may change the number of pixels of the captured image (the original image 10), on the basis of the detection result of the thermometer 28. Further, in FIG. 2D and FIG. 2E, the electronic hand shake correction section 26 may change the number of pixels of the captured image (the original image 10), on the basis of the detection results of the thermometer 28 and the thermometer 37. Further, in FIG. 2F, the electronic hand shake correction sections 26 and 36 may change the number of pixels of the captured image (the original image 10), on the basis of the detection results of the thermometer 28 and the thermometer 37. Further, in FIG. 2G and FIG. 2H, the electronic hand shake correction section 26 may change the number of pixels of the captured image (the original image 10), on the basis of the detection result of the thermometer 37. Furthermore, in FIG. 2I, the electronic hand shake correction sections 26 and 36 may change the number of pixels of the captured image (the original image 10), on the basis of the detection result of the thermometer 37.

FIG. 3(A), FIG. 3(B), and FIG. 3(C) are diagrams illustrating an example of an algorithm of the electronic hand shake correction of the imaging unit 1. FIG. 3(A), FIG. 3(B), and FIG. 3(C) exemplify that the number of pixels of the captured image (the original image 10) is changed depending on the temperature, and the number of pixels of the cutout region 12 is fixed irrespective of the temperature. FIG. 3(A) is a diagram illustrating an example of the hand shake correction margin MG when the temperature is low, and illustrating a state in which the hand shake correction margin MG is provided by about 10% around the cutout region 12. FIG. 3(C) is a diagram illustrating an example of the hand shake correction margin MG when the temperature is high, and illustrating a state in which the hand shake correction margin MG is provided by about 5% around the cutout region 12. FIG. 3(B) is a diagram illustrating an example of the hand shake correction margin MG when the temperature is at middle between the temperature of FIG. 3(A) and the temperature of FIG. 3(B), and illustrating a state in which the hand shake correction margin MG is provided by about 8% around the cutout region 12.

FIG. 4 is a graph illustrating an example of the algorithm of the electronic hand shake correction in the imaging unit 1. The electronic hand shake correction sections 26 and 36 intermittently decrease the hand shake correction margin MG (in a stepwise manner) as the temperature rises, and intermittently increase the hand shake correction margin MG (in a stepwise manner) as the temperature falls. Further, the electronic hand shake correction sections 26 and 36 set a threshold for change of the hand shake correction margin MG to be different between when temperature rises and when the temperature falls. This prevents frequent changeover of the hand shake correction margin MG when the detection temperature temporally fluctuates in the vicinity of the threshold for change of the hand shake correction margin MG. The electronic hand shake correction sections 26 and 36 acquire the temperature used for changeover determination of the hand shake correction margin MG from the thermometer 28 or the thermometer 37 or both.

The electronic hand shake correction sections 26 and 36 may include a table for temperature rising and a table for temperature falling. The table for temperature rising shows relationship between the temperature and the hand shake correction margin when the temperature rises. The table for temperature falling shows relationship between the temperature and the hand shake correction margin MG when the temperature falls. The electronic hand shake correction sections 26 and 36 may include various kinds of setting data relating to the electronic hand shake correction accuracy for each size of the hand shake correction margin MG. Examples of the various kinds of setting data relating to the electronic hand shake correction accuracy may include data relating to "an ID of the A/D converter to be used (an ID of the A/D converter 23 or the A/D converter 33)", data relating to "the pixel number of the captured image (the original image 10)" described later, data relating to "the region to be subjected to the A/D conversion" described later, and data relating to "the electronic hand shake correction accuracy" described later. In such a case, the electronic hand shake correction sections 26 and 36 may provide, to the devices in the imaging unit 1 that need the respective data, the various kinds of selling data corresponding to the size of the hand shake correction margin MG every time the hand shake correction margin MG is changed. Note that, when the hand shake correction margin MG become lower than a certain value, the electronic hand shake correction sections 26 and 36 may turn off the electronic hand shake correction.

Incidentally, to change the hand shake correction margin MG, for example, the number of pixels of the captured image (the original image 10) obtained from the imaging device 22 may be changed. To change the number of pixels of the captured image (the original image 10), for example, the imaging device 22 may change the number of pixels on the basis of the detection result of the thermometer 28 or the thermometer 37 or both, and then may output the captured image (the original image 10). Further, to change the number of pixels of the captured image (the original image 10), for example, the A/D converter 23 or the A/D converter 33 may determine a region to be subjected to the A/D conversion in the captured image (the original image 10), on the basis of the detection result of the thermometer 28 or the thermometer 37 or both. In other words, the A/D converter 23 or the A/D converter 33 may change the size of the A/D conversion region in the captured image (the original image 10), on the basis of the detection result of the thermometer 28 or the thermometer 37 or both. At this time, the A/D converter 23 or the A/D converter 33 may acquire temperature information directly or through the electronic hand shake correction section 26, from the thermometer 28 or the thermometer 37 or both. The A/D converter 3 or the A/D converter 33 may perform the A/D conversion only on the pixel data corresponding to the region to be subjected to the A/D conversion in the captured image (the original image 10).

Note that the electronic hand shake correction section 26 or the electronic hand shake correction section 36 may perform determination of the region to be subjected to the A/D conversion in the captured image (the original image 10). In other words, the electronic hand shake correction section 26 or the electronic hand shake correction section 36 may determine the region to be subjected to the A/D conversion in the captured image (the original image 10) on the basis of the detection result of the thermometer 28 or the thermometer 37 or both, and provide a control signal corresponding to the determined region, to the A/D converter 23 or the A/D converter 33.

Further, for example, as illustrated in FIG. 5A, FIG. 5B, and FIG. 5C, the imaging unit 1 may include an optical hand shake correction controller 38. The optical hand shake correction controller 38 performs the hand shake correction with use of the optical lens 21, and displaces the optical lens 21, on the basis of the displacement-rotation information provided from the gyroscope 27. At this time, the optical hand shake correction controller 38 is incorporated in the module 1A or the module 1C. The optical hand shake correction controller 38 turns on or off the optical hand shake correction, on the basis of the detection result obtained from the thermometer 28 or the thermometer 37 or both.

For example, when the temperature of the module 1B or 1D detected by the thermometer 28 is higher than a predetermined temperature, the electronic hand shake correction section 26 may stop the electronic hand shake correction in the electronic hand shake correction section 26, and may control the optical hand shake correction controller 38 to start optical hand shake correction in the optical hand shake correction controller 38 (see FIG. 5A). In contrast, for example, when the temperature of the module 1B or 1D detected by the thermometer 28 is lower than the predetermined temperature, the electronic hand shake correction section 26 may control the optical hand shake correction controller 38 to stop the optical hand shake correction in the optical hand shake correction controller 38, and may start the electronic hand shake correction in the electronic hand shake correction section 26 (see FIG. 5A).

Further, for example, when the temperature of the module 1B or 1D detected by the thermometer 28 is higher than the predetermined temperature and the temperature of the module 1A or 1C detected by the thermometer 37 is lower than a predetermined temperature, the electronic hand shake correction section 26 may stop the electronic hand shake correction in the electronic hand shake correction section 26, and may control the optical hand shake correction controller 38 to start the optical hand shake correction in the optical hand shake correction controller 38 (see FIG. 5B). Further, for example, when the temperature of the module 1B or 1D detected by the thermometer 28 is lower than the predetermined temperature and the temperature of the module 1A or 1C detected by the thermometer 37 is higher than the predetermined temperature, the electronic hand shake correction section 26 may control the optical hand shake correction controller 38 to stop the optical hand shake correction in the optical hand shake correction controller 38 and may start the electronic hand shake correction in the electronic hand shake correction section 26 (see FIG. 5B).

Further, for example, when the temperature of the module 1A or 1C detected by the thermometer 37 is higher than the predetermined temperature, the optical hand shake correction controller 38 may be controlled to stop the optical hand shake correction in the optical hand shake correction controller 38 and the electronic hand shake correction may start in the electronic hand shake correction section 26 (see FIG. 5C). Furthermore, for example, when the temperature of the module 1A or 1C detected by the thermometer 37 is lower than the predetermined temperature, the electronic hand shake correction section 26 may stop the optical hand shake correction in the electronic hand shake correction in the electronic hand shake correction section 26 and may control the optical hand shake correction controller 38 to start the optical hand shake correction in the optical hand shake correction controller 38 (see FIG. 5C).

[Correction Procedure]

Next, description is given of a procedure of the electronic hand shake correction. FIG. 6 is a diagram illustrating an example of the procedure of the electronic hand shake correction in the imaging unit 1.

First, a user activates the imaging unit 1 (step S101). Then, the imaging unit 1 activates the hand shake correction function in addition to the imaging function (step S102). Thereafter, the electronic hand shake correction section 26 continuously or intermittently acquires the detection result relating to the temperature, from the thermometer 28 or the thermometer 37 (step S103), and determines whether the temperature variation is in a temperature rising phase (step S104). As a result, when the temperature variation is in the temperature rising phase, the electronic hand shake correction section 26 determines whether the temperature is equal to or higher than 50° C., on the basis of the acquired detection result relating to the temperature (step S105). As a result, when the temperature is equal to or higher than 50° C., the electronic hand shake correction section 26 determines whether the temperature is equal to or higher than 60° C., on the basis of the acquired detection result relating to the temperature (step S106). As a result, when the temperature is equal to or higher than 60° C., the electronic hand shake correction section 26 selects, for example, 5% as the hand shake correction margin MG (step S107). At this time, for example, the electronic hand shake correction section 26 may provide the various kinds of setting data corresponding to the hand shake correction margin MG of 5%, to the devices in the imaging unit 1 that need the respective data. The imaging unit 1 continuously captures images with use of the tables and the setting data provided by the electronic hand shake correction section 26 (step S108).

When the temperature variation is not in the temperature rising phase in step S104, the electronic hand shake correction section 26 determines whether the temperature variation is in a temperature falling phase, on the basis of the acquired detection result relating to the temperature (step S109). As a result, when the temperature variation is in the temperature falling phase, the electronic hand shake correction section 26 determines whether the temperature is equal to or lower than 58° C., on the basis of the acquired detection result relating to the temperature (step S110). As a result, when the temperature is not equal to or lower than 58° C., the electronic hand shake correction section 26 may select, for example, 8% as the hand shake correction margin MG (step S111). At this time, for example, the electronic hand shake correction section 26 may provide the various kinds of setting data corresponding to the hand shake correction margin MG of 8% to the devices in the imaging unit 1 that need the respective setting data. The imaging unit 1 continuously captures images with use of the tables and the setting data provided by the electronic hand shake correction section 26 (step S108).

When the temperature is equal to or lower than 58° C. in step S110, the electronic hand shake correction section 26 determines whether the temperature is equal to or lower than 48° C., on the basis of the acquired detection result relating to the temperature (step S112). Likewise, when the temperature is not equal to or higher than 50° C. in step S105, the electronic hand shake correction section 26 determines whether the temperature is equal to or lower than 48° C., on the basis of the acquired detection result relating to the temperature (step S112). As a result, when the temperature is equal to or lower than 48° C., the electronic hand shake correction section 26 may select, for example, 10% as the hand shake correction margin MG (step S113). At this time, for example, the electronic hand shake correction section 26 may provide the various kinds of setting data corresponding to the hand shake correction margin MG of 10%, to the devices in the imaging unit 1 that need the respective setting data.

When the temperature is not equal to or higher than 60° C. in step S106, the electronic hand shake correction section 26 may select, for example, 8% as the hand shake correction margin MG (step S111). At this time, for example, the electronic hand shake correction section 26 may provide the various kinds of setting data corresponding to the hand shake correction margin MG of 8%, to the devices in the imaging unit 1 that need the respective setting data. The imaging unit 1 continuously captures images with use of the tables and the setting data provided by the electronic hand shake correction section 26 (step S108).

When the temperature is not equal to or lower than 48° C. in step S112, the electronic hand shake correction section 26 may select, for example, 10% as the hand shake correction margin MG (step S113). At this time, for example, the electronic hand shake correction section 26 may provide the various kinds of setting data corresponding to the hand shake correction margin MG of 10%, to the devices in the imaging unit 1 that need the respective setting data. The imaging unit 1 continuously captures images with use of the tables and the setting data provided by the electronic hand shake correction section 26 (step S108).

Incidentally, when the thermometer 28 and the thermometer 37 are both provided, the electronic hand shake correction section 26 may perform selection, on the basis of the detection results (temperature data) obtained from the two thermometers 28 and 37. Such selection is effective in particular when a device equivalent to a device included in the module with higher temperature is provided in the module with lower temperature.

For example, there may be a case in which the module 1A includes the A/D converter 33 and the module 1B includes the A/D converter 23. Note that the A/D converter 33 may be incorporated in the imaging device 22. In this case, the electronic hand shake correction section 26 may determine whether to use the A/D converter 23 or the A/D converter 33, on the basis of the detection result obtained from the thermometer 28 or the thermometer 37 or both. For example, there may be a case in which the temperature of the module 1B is within a predetermined range in a temperature range corresponding to the hand shake correction margin MG of 5% and the temperature is in the temperature rising phase. In this case, there may be a case in which the temperature of the module 1A is within a temperature range corresponding to the hand shake correction margin MG of 10% or 8%. In such a case, the electronic hand shake correction section 26 may control the A/D converters 23 and 33 to stop the use of the A/D converter 23 and to start the use of the A/D converter 33.

Moreover, for example, there may be a case in which the module 1A includes blocks from the A/D converter 33 to the electronic hand shake correction section 36 and the module 1B includes blocks from the A/D converter 23 to the electronic hand shake correction section 26. Note that the blocks from the A/D converter 33 to the electronic hand shake correction section 36 may be incorporated in the imaging device 22. At this time, the electronic hand shake correction section 26 may determine whether to use the blocks from the A/D converter 23 to the electronic hand shake correction section 26 or the blocks from the A/D converter 33 to the electronic hand shake correction section 36, on the basis of the detection result obtained from the thermometer 28 or the thermometer 37 or both. For example, there may be a case in which the temperature of the module 19 is within a predetermined range in the temperature range corresponding to the hand shake correction margin MG of 5% and the temperature is in the temperature rising phase. At this time, there may be a case in which the temperature of the module 1A is within the temperature range corresponding to the hand shake correction margin MG of 10% or 8%. In such a case, the electronic hand shake correction section 26 may control the A/D converters 23 and 33 to stop the use of the blocks from the A/D converter 23 to the electronic hand shake correction section 26 and to start the use of the blocks from the A/D converter 33 to the electronic hand shake correction section 36.

Further, for example, there may be a case in which the module 1A includes the optical hand shake correction controller 38 and the module 1B includes the electronic hand shake correction section 26. At this time, the electronic hand shake correction section 26 may determine whether to perform the optical hand shake correction in place of the electronic hand shake correction, on the basis of the detection result obtained from the thermometer 28 or the thermometer 37 or both. For example, there may be a case in which the temperature of the module 1B is within a predetermined range in the temperature range corresponding to the hand shake correction margin MG of 5% and the temperature is in the temperature rising phase. At this time, there may be a case in which the temperature of the module 1A is within the temperature range corresponding to the hand shake correction margin MG of 10% or 8%. In such a case, the electronic hand shake correction section 26 may instruct the optical hand shake correction controller 38 to perform the optical hand shake correction, and then stops the electronic hand shake correction. When the hand shake correction margin MG becomes lower than a certain value, the electronic hand shake correction section 26 may change correction from the electronic hand shake correction to the optical hand shake correction. When receiving the instruction of the optical hand shake correction from the electronic hand shake correction section 26, the optical hand shake correction controller 38 may immediately perform the optical hand shake correction using the optical lens 21.

[Effects]

Next, description is given of effects of the imaging unit 1 according to the present embodiment is described.

The imaging unit 1 according to the present embodiment may change the electronic hand shake correction accuracy with respect to the captured image (the original image 10) obtained by the imaging device 22 when the electronic hand shake correction function is enabled, on the basis of the detection result of the thermometer 28 or the thermometer 34 or both. For example, the size of the hand shake correction margin MG when the region including the object 11 is cut out from the captured image (the original image 10) is changed on the basis of the detection result of the thermometer 28 or the thermometer 34 or both. In this way, in the present embodiment, the electronic hand shake correction accuracy is gradually changed according to the temperature or the temperature variation within the imaging unit 1 without turning on or off the electronic hand shake correction abruptly. This makes it possible to provide natural bodily sensation of a user as compared with the case where the electronic hand shake correction is abruptly turned on or off.

<3. Modification>

In the above-described embodiment, the "electronic hand shake correction accuracy" is defined as the concept relating to positional fluctuation of the object 11 in the plurality of corrected images 13. Even if the "fluctuation" is not changed, however, bodily sensation of the electronic hand shake correction accuracy may change only by changing frequency of the electronic hand shake correction (the number of times of the electronic hand shake correction performed on the moving picture per unit time). Therefore, the "electronic hand shake correction accuracy" is strictly a concept relating not only to the positional fluctuation of the object 11 in the plurality of corrected images 13 but also to the frequency of the electronic hand shake correction (the number of times of the electronic hand shake correction performed on the moving picture per unit time).

Accordingly, in the present modification, as illustrated in FIG. 7(A), FIG. 7(B), and FIG. 7(C), the electronic hand shake correction section 26 changes the frequency of the electronic hand shake correction, on the basis of the detection result of the thermometer 28 or the thermometer 37 or both. The electronic hand shake correction section 26 decreases the frequency of the electronic hand shake correction as the temperature rises, and increases the frequency of the electronic hand shake correction as the temperature falls. The electronic hand shake correction section 26 may preferably set a threshold for change of the frequency of the electronic hand shake correction to be different between when temperature rises and when the temperature falls.

The electronic hand shake correction section 26 may further change a sampling period or an output period of the detection result of the gyroscope 27 as well as the thermometer 28 or the thermometer 34 or both, on the basis of the detection result of the thermometer 28 or the thermometer 37 or both. For example, the electronic hand shake correction section 26 may generate a control signal relating to the sampling period or the output period of the detection result, on the basis of the detection result of the thermometer 28 or the thermometer 37 or both, and may provide the generated control signal to the gyroscope 27 as well as the thermometer 28 or the thermometer 34 or both. The gyroscope 27 may change the sampling period or the output period of the detection result, on the basis of the control signal relating to the sampling period or the output period of the detection result provided from the electronic hand shake correction section 26. In addition, the thermometers 28 and 34 may change the sampling period or the output period of the detection result, on the basis of the control signal relating to the sampling period or the output period of the detection result provided from the electronic hand shake correction section 26.

The electronic hand shake correction section 26 may control the gyroscope 27 as well as the thermometer 28 or the thermometer 34 or both to increase the sampling period or the output period of the detection result as the temperature rises. Further, the electronic hand shake correction section 26 may control the gyroscope 27 as well as the thermometer 28 or the thermometer 34 or both to decrease the sampling period or the output period of the detection result as the temperature falls.

In the present modification, the frequency of the electronic hand shake correction is changed on the basis of the detection result of the thermometer 28 or the thermometer 37 or both. This makes it possible to provide natural bodily sensation of a user as compared with the case in which the electronic hand shake correction is abruptly turned on or off. Moreover, it is possible to change the power consumption and the heat generation amounts of the modules 1A, 1B, 1C and 1D along with the change of the frequency of the electronic hand shake correction.

Further, in the present modification, when the sampling period or the output period of the detection result is changed with respect to the gyroscope 27 as well as the thermometer 28 or the thermometer 34 or both, on the basis of the detection result of the thermometer 28 or the thermometer 37 or both, it is possible to change the power consumption and the heat generation amounts of the modules 1A, 1B, 1C and 1D.

Accordingly, even in the present modification, it is possible to reduce the heat generation inside the terminal and the power consumption of the terminal without abruptly changing the bodily sensation of the user.

<4. Application Examples to Electronic Apparatus>

The above-described imaging unit 1 is applicable to electronic apparatuses, for example, a digital still camera, a video camera, a mobile terminal such as a smartphone (a multifunctional mobile phone) having an imaging function, a capsule endoscope, an eyeglasses-type imaging apparatus in which an imaging function is added to eyeglasses. In the following, specific examples of an electronic apparatus to which the imaging unit 1 is applied are described. Note that the electronic apparatus corresponds to a specific example of an "electronic apparatus" of the disclosure.

Application Example 1

Imaging Unit in Chip Form

FIG. 8A, FIG. 8B, and FIG. 8C are diagrams each illustrating a configuration example in which an electronic circuit portion of the imaging unit 1 is configured in a chip form. For example, an imaging unit 330 illustrated in FIG. 8A may include a pixel region 332, a control circuit 333, and a logic circuit 334, in one semiconductor chip section 331. The pixel region 332 may include the pixel array section of the above-described imaging device 22. The control circuit 333 may include the peripheral circuit section of the above-described imaging device 22 and may supply a control signal to the pixel region 332. The logic circuit 334 may include the A/D converter 23, the electronic hand shake correction section 26, and other sections mentioned above.

An imaging unit 340 illustrated in FIG. 8B is configured of a semiconductor chip section 341 and a semiconductor chip section 342. The semiconductor chip section 341 includes a pixel region 343 and a control circuit 344. The pixel region 343 includes the above-described pixel array section of the imaging device 22. The control circuit 344 includes the above-described peripheral circuit section of the imaging device 22 and supplies a control signal to the pixel region 332. The semiconductor chip section 342 includes a logic circuit 345 that includes the A/D converter 23, the A/D converter 33, the electronic hand shake correction section 26, the electronic hand shake correction section 36, or other sections mentioned above. In addition, the semiconductor chip section 341 and the semiconductor chip section 342 are electrically coupled to each other, thereby configuring the imaging unit 341 serving as one semiconductor chip. In other words, the A/D converter 23, the A/D converter 33, the electronic hand shake correction section 26, or the electronic hand shake correction section 36 is provided in the logic circuit 345 that is stacked on the semiconductor chip section 341 (the imaging device 22).

An imaging unit 350 illustrated in FIG. 8C is configured of a semiconductor chip section 351 and a semiconductor chip section 352. The semiconductor chip section 351 includes a pixel region 353 that includes the above-described pixel array section of the imaging device 22. The semiconductor chip section 352 includes a control circuit 354 and a logic circuit 355. The control circuit 354 includes the above-described peripheral circuit section of the imaging device 22, and supplies a control signal to the pixel region 332. The logic circuit 355 includes the A/D converter 23, the A/D converter 33, the electronic hand shake correction section 26, the electronic hand shake correction section 36, or other sections. In other words, the A/D converter 23, the A/D converter 33, the electronic hand shake correction section 26, or the electronic hand shake correction section 36 is provided in the logic circuit 355 that is stacked on the semiconductor chip section 351 (the imaging device 22). In addition, the semiconductor chip section 351 and the semiconductor chip section 352 are electrically coupled to each other, thereby configuring the imaging unit 350 serving as one semiconductor chip.

Application Example 2

Application Example to Capsule Endoscope

FIG. 9 is a diagram illustrating a cross-sectional configuration example of a capsule endoscope 600 on which the imaging unit 1 is mounted. The capsule endoscope 600 illustrated in FIG. 9 includes, for example, in a housing 610, a camera (a microminiature camera) 611, a memory 612, and a wireless transmitter 613. The housing 610 may have hemisphere surfaces on both ends and a cylinder-like center part. The camera 611 captures an image in a body cavity. The memory 612 holds image data captured by the camera 611. The wireless transmitter 613 transmits the stored image data to the outside through an antenna 614 after the capsule endoscope 600 is discharged to the outside of the body of a subject.

Further, a CPU 615, a coil (a magnetic force-current conversion coil) 616, and the gyroscope 27 are provided in the housing 610. Furthermore, the thermometer 28 or the thermometer 37 or both are provided in the housing 610. Note that FIG. 9 illustrates a state in which both the thermometer 28 and the thermometer 37 are provided. The CPU 615 controls imaging operation by the camera 611 and data accumulation operation to the memory 612, and controls data transmission from the memory 612 to a data receiver (not illustrated) outside the housing 610 through the wireless transmitter 613. The coil 616 supplies power to each of the camera 611, the memory 612, the wireless transmitter 613, the antenna 614, and a light source 611b described later. The thermometer 28 is disposed near the CPU 615. The thermometer 37 is disposed near the camera 611 (a processor 611c described later).

Further, a reed (magnetic) switch 617 that detects setting of the capsule endoscope 600 to the data receiver is provided in the housing 610. The power supply from the coil 616 to the wireless transmitter 613 is started at the time when the reed switch 617 detects the setting to the data receiver and data transmission is enabled. The camera 611 may include, for example, a solid-state imaging device 611a, a plurality of (two in this case) light sources 611b, and the processor 611c. The solid-state imaging device 611a includes an objective optical system that captures an image in the body cavity. The plurality of light sources 611b illuminate the inside of the body cavity. The processor 611c processes the data obtained by the solid-state imaging device 611a. Each of the light sources 611b may be configured of, for example, a light emitting diode (LED). The imaging device 611a includes the imaging device 22 and the optical lens 21 of FIG. 2. The imaging device 611a may further include the optical hand shake correction controller 33 as necessary. The CPU 615 performs control corresponding to the electronic hand shake correction section 26 of FIG. 2. The processor 611c may include the A/D converter 33 or blocks from the A/D converter 33 to the electronic hand shake correction section 36.

Application Example 3

Application Example to Smartphone

FIG. 10A is a diagram illustrating an appearance configuration of a smartphone on which the imaging unit 1 is mounted. A smartphone 500 may include a speaker 511, a display 512, an operation button 513, a microphone 514, an imaging section 515, and other components. When a telephone function is executed in the smartphone 500, transmitted voice acquired from the microphone 514 is transmitted to a base station through a communication section (not illustrated), and received voice from an opposite party is supplied from the communication section to the speaker 511 and is reproduced acoustically.

The display 512 may be configured of, for example, a liquid crystal display (LCD), and may display a predetermined screen such as a standby screen. The display 512 is overlapped with a touch panel, and allows for detection of operation input to the display 512 by, for example, a finger of the user. The smartphone 500 may perform predetermined processing, for example, execution of the imaging function, in response to the detected operation input of the user. The imaging section 515 includes the imaging device 22 and the optical lens 21. For example, the imaging section 515 may capture an image of an object, and may store image data obtained as a result in an internal memory or other memory.

The imaging section 515 may further include the optical hand shake correction controller 33. The imaging section 515 may further include the A/D converter 23. When the imaging section 515 includes the A/D converter 23, the imaging section 515 may further include the thermometer 28, for example, as illustrated in FIG. 10B. Note that when the thermometer 28 is included in the imaging section 515, the thermometer 28 is disposed adjacently to at least the imaging device 22 and the A/D converter 23. Therefore, in this case, the thermometer 28 manly measures the temperature of the imaging device 22 and the A/D converter 23.

When the thermometer 28 is provided in the imaging section 515 and measures the temperature of the imaging device 22 and the A/D converter 23, the electronic hand shake correction section 26 may preferably perform hand shake correction, on the basis of the detection result of the thermometer 28 in the imaging section 515.

As illustrated in FIG. 10C, the smartphone 500 includes an electronic circuit 516 that controls the speaker 511, the display 512, the operation button 513, the microphone 514, the imaging section 515, and other components. The smartphone 500 further includes the gyroscope 27. The electronic circuit 516 may further include blocks from the A/D converter 23 to the electronic hand shake correction section 26 and blocks from the demosaicing section 29 to the luminance chrominance signal correction section 31. At this time, the thermometer 28 may be disposed adjacently not to the imaging section 515 but to the electronic circuit 516. When the thermometer 28 is provided adjacently to the electronic circuit 516, the thermometer 28 mainly measures the temperature of the electronic hand shake correction section 26 and the A/D converter 23. When the thermometer 28 is provided adjacently to the electronic circuit 516 and the electronic circuit 516 includes a substrate, the thermometer 28 may he disposed on the substrate of the electronic circuit 516.

When the thermometer 28 is provided adjacently to the electronic circuit 516 and measures the temperature of the electronic hand shake correction section 26 and the A/D converter 23, the electronic hand shake correction section 26 may preferably perform the hand shake correction, on the basis of the detection result of the thermometer 28 in the electronic circuit 516.

For example, as illustrated in FIG. 10D, the smartphone 500 may include the thermometer 28 adjacent to the electronic circuit 516 and include the thermometer 37 in the imaging section 515. In this case, the imaging section 515 and the electronic circuit 516 are disposed separately from each other in the housing of the smartphone 500, which makes it possible for the electronic hand shake correction section 26 to perform the hand shake correction, on the basis of the detection result obtained from the thermometer 37 (the temperature of the imaging section 515) and the detection result obtained from the thermometer 28 (the temperature of the electronic circuit 516).

When the temperature of the imaging section 515 is lower than the temperature of the electronic circuit 516 as a result of comparison of the detection result obtained from the thermometer 37 (the temperature of the imaging device 515) with the detection result obtained from the thermometer 28 (the temperature of the electronic circuit 516), the electronic hand shake correction section 26 may cause the A/D converter 23 in the electronic circuit 516 to stop the A/D conversion, and may cause the A/D converter 33 in the imaging section 515 to perform the A/D conversion. In contrast, when the temperature of the electronic circuit 516 is lower than the temperature of the imaging section 515 as a result of the comparison of the detection result obtained from the thermometer 37 (the temperature of the imaging device 515) with the detection result obtained from the thermometer 28 (the temperature of the electronic circuit 516), the electronic hand shake correction section 26 may cause the A/D converter 33 in the imaging section 515 to stop the A/D conversion, and may cause the A/D converter 23 in the electronic circuit 516 to perform the A/D conversion.

For example, the smartphone 500 illustrated in FIG. 10D may further include blocks from the A/D converter 33 to the electronic hand shake correction section 36 in the imaging section 515, as illustrated in FIG. 10E. In this case, the imaging section 515 and the electronic circuit 516 are disposed separately from each other in the housing of the smartphone 500, which makes it possible for the electronic hand shake correction section 26 to perform the hand shake correction, on the basis of the detection result obtained from the thermometer 28 (the temperature of the imaging section 515) and the detection result obtained from the thermometer 28 (the temperature of the electronic circuit 516).

When the temperature of the imaging section 515 is lower than the temperature of the electronic circuit 516 as a result of comparison of the detection result obtained from the thermometer 28 (the temperature of the imaging section 515) with the detection result obtained from the thermometer 28 (the temperature of the electronic circuit 516), the electronic hand shake correction section 26 may cause the section from the A/D converter 23 to the electronic hand shake correction section 26 in the electronic circuit 516 to stop the A/D conversion and the electronic hand shake correction, and may cause the section from the A/D converter 33 to the electronic hand shake correction section 36 in the imaging section 515 to perform the A/D conversion and the electronic hand shake correction. In contrast, when the temperature of the electronic circuit 516 is lower than the temperature of the imaging section 515 as a result of the comparison of the detection result obtained from the thermometer 28 (the temperature of the imaging section 515) with the detection result obtained from the thermometer 28 (the temperature of the electronic circuit 516), the electronic hand shake correction section 26 may cause the section from the A/D converter 33 to the electronic hand shake correction section 36 in the imaging section 515 to stop the A/D conversion and the electronic hand shake correction, and may cause the section from the A/D converter 23 to the electronic hand shake correction section 26 in the electronic circuit 516 to perform the A/D conversion and the electronic hand shake correction.

Application Example 4

Application Example to Eyeglasses-type Imaging Apparatus

FIG. 11 is a diagram illustrating a configuration example of an eyeglasses-type imaging apparatus 400 on which the imaging unit 1 is mounted.

The eyeglasses-type imaging apparatus 400 of FIG. 11 includes an imaging device 412 and a housing 414. The imaging device 412 is attached to a center part of a frame 411. The housing 414 fixes an eyeglass lens 413 and houses an image signal processing circuit that drives and controls the imaging device 412. The imaging device 412 includes the imaging device 22. The eyeglasses-type imaging apparatus 400 includes, in the housing 414, an image signal processing circuit that has a function of controlling blocks from the A/D converter 23 to the electronic hand shake correction section 26, blocks from the demosaicing section 29 to the luminance chrominance signal generator 31, and other sections. The image signal processing circuit in the housing 414 further includes the gyroscope 27 and the thermometer 28. The thermometer 28 is disposed adjacently to the A/D converter 23 and the electronic hand shake correction section 26 in the housing 414. Therefore, the thermometer 28 measures the temperature of the A/D converter 23 and the electronic hand shake correction section 26 in the housing 414.

The image data captured by the imaging device 412 is transmitted to an external circuit through a communication cable 415. The eyeglasses-type imaging apparatus 400 may include a wireless communication function and transmit the image data through wireless communication. Further, the image captured by the imaging device 412 may be projected to the eyeglass lens 413.

The eyeglasses-type imaging apparatus 400 may include the thermometer 28 adjacent to the image signal processing circuit in the housing 414, and may include the thermometer 37 adjacent to the imaging device 412. In this case, the imaging device 412 and the image signal processing circuit in the housing 414 are disposed separately from each other, which makes it possible for the electronic hand shake correction section 26 to perform the hand shake correction, on the basis of the detection result obtained from the thermometer 37 (the temperature of the imaging device 412) and the detection result obtained from the thermometer 28 (the temperature of the image signal processing circuit in the housing 414).

When the temperature of the imaging device 412 is lower than the temperature of the image signal processing circuit in the housing 414 as a result of comparison of the detection result obtained from the thermometer 37 (the temperature of the imaging device 412) with the detection result obtained from the thermometer 28 (the temperature of the image signal processing circuit in the housing 414), the electronic hand shake correction section 26 may cause the A/D converter 23 included in the image signal processing circuit in the housing 414 to stop the A/D conversion, and may cause the A/D converter 33 adjacent to the imaging device 412 to perform the A/D conversion. In contrast, when the temperature of the image signal processing circuit in the housing 414 is lower than the temperature of the imaging device 412 as a result of the comparison of the detection result obtained from the thermometer 37 (the temperature of the imaging device 412) with the detection result obtained from the thermometer 28 (the temperature of the image signal processing circuit in the housing 414), the electronic hand shake correction section 26 may cause the A/D converter 33 adjacent to the imaging device 412 to stop the A/D conversion, and may cause the A/D converter 23 included in the image signal processing circuit in the housing 414 to perform the A/D conversion.

The eyeglasses-type imaging apparatus 400 may further include blocks from the A/D converter 33 to the electronic hand shake correction section 36 adjacent to the imaging device 412. In this case, the imaging device 412 and the image signal processing circuit in the housing 414 are disposed separately from each other, which makes it possible for the electronic hand shake correction section 26 to perform the hand shake correction, on the basis of the detection result obtained from the thermometer 37 (the temperature of the imaging device 412) and the detection result obtained from the thermometer 28 (the temperature of the image signal processing circuit in the housing 414).

When the temperature of the imaging section 412 is lower than the temperature of the image signal processing circuit in the housing 414 as a result of comparison of the detection result obtained from the thermometer 37 (the temperature of the imaging device 412) with the detection result obtained from the thermometer 28 (the temperature of the image signal processing circuit in the housing 414), the electronic hand shake correction section 26 may cause the blocks from the A/D converter 23 to the electronic hand shake correction section 26 included in the image signal processing circuit in the housing 414 to stop the A/D conversion and the electronic hand shake correction, and may cause the blocks from the A/D converter 33 to the electronic hand shake correction section 36 adjacent to the imaging section 412 to perform the A/D conversion and the electronic hand shake correction. In contrast, when the temperature of the image signal processing circuit in the housing 414 is lower than the temperature of the imaging section 412 as a result of the comparison of the detection result obtained from the thermometer 37 (the temperature of the imaging device 412) with the detection result obtained from the thermometer 28 (the temperature of the image signal processing circuit in the housing 414), the electronic hand shake correction section 26 may cause the blocks from the A/D converter 33 to the electronic hand shake correction section 36 adjacent to the imaging section 412 to stop the A/D conversion and the electronic hand shake correction, and may cause the blocks from the A/D converter 23 to the electronic hand shake correction section 26 included in the image signal processing circuit in the housing 414 to perform the A/D conversion and the electronic hand shake correction.

<5. Common Modification>

Hereinbefore, although the technology has been described with referring to the embodiment, the modification, and the application examples, the technology is not limited to the above-described embodiment and examples, and various modifications may be made. Note that the effects described in the present specification are illustrative and effects of the technology are not limited to effects described in the present specification. The technology may provide effects other than those described in the present specification.

In the above-described embodiment, the above-described modification of the embodiment, and the above-described application examples of the embodiment, the imaging unit 1 may include a detector detecting remaining capacity of a battery (a remaining battery capacity meter 39) in place of the thermometers 28 and 37 (see FIG. 12). The remaining battery capacity meter 39 detects an output voltage of the battery. The remaining battery capacity meter 39 provides the detected output voltage to the electronic hand shake correction sections 26 and 36. Note that the remaining battery capacity meter 39 may convert the detected output voltage into remaining battery capacity, and then provide the remaining battery capacity to the electronic hand shake correction sections 26 and 36.

The electronic hand shake correction sections 26 and 36 intermittently decrease the hand shake correction margin MG (in a stepwise manner) as the temperature rises, and intermittently increase the hand shake correction margin MG (in a stepwise manner) as the temperature falls. In addition, the electronic hand shake correction sections 26 and 36 set the threshold for change of the hand shake correction margin MG to be different between when the power voltage rises and when the power voltage falls. This prevents frequent changeover of the hand shake correction margin MG when the detected remaining capacity amount temporally fluctuates near the threshold for change of the hand shake correction margin MG. The electronic hand shake correction sections 26 and 36 acquire the temperature used for changeover determination of the hand shake correction margin MG, from the thermometer 28 or the thermometer 37 or both.

When the remaining battery capacity meter 39 is provided in place of the thermometers 28 and 37, the parameter is changed from the temperature to the remaining battery capacity. Therefore, in the above-described embodiment, the above-described modification of the embodiment, and the above-described application examples of the embodiment, the high temperature is replaced with small remaining capacity, the low temperature is replaced with large remaining capacity, the temperature rising is replaced with decrease of the remaining capacity, and the temperature falling is replaced with increase of the remaining capacity.

Moreover, the present technology may have the following configurations.

(1)
An imaging unit, including:
a detector that detects temperature or remaining battery capacity;
an imaging device that obtains a captured image; and
a first correction section that changes, on a basis of a detection result of the detector, electronic hand shake correction accuracy with respect to the captured image obtained by the imaging device when an electronic hand shake correction function is enabled.

(2)
The imaging unit according to (1), wherein the first correction section changes, on the basis of the detection result of the detector, a size of a hand shake correction margin when a region including an object is cut out from the captured image.

(3)
The imaging unit according to (2), wherein the first correction section changes the number of pixels of the captured image, on the basis of the detection result of the detector.

(4)
The imaging unit according to (3), wherein
the first correction section includes an analog-to-digital converter that converts the captured image into digital data, and
the analog-to-digital converter changes a size of an analog-to-digital conversion region in the captured image, on the basis of the detection result of the detector.

(5)
The imaging unit according to (1), wherein
the first correction section includes a first analog-to-digital converter that converts the captured image into digital data,
the imaging device includes a second analog-to-digital converter that converts the captured image into digital data,
each of the first analog-to-digital converter and the second analog-to-digital converter changes a size of an analog-to-digital conversion region in the captured image, on the basis of the detection result of the detector, and the first correction section determines whether to use the first analog-to-digital converter or the second analog-to-digital converter, on the basis of the detection result of the detector.

(6)

The imaging unit according to (1), wherein the imaging device includes a second correction section that changes, on the basis of the detection result of the detector, the electronic hand shake correction accuracy with respect to the captured image obtained by the imaging device when the electronic hand shake correction function is enabled, and the first correction section determines whether to use the first correction section or the second correction section, on the basis of the detection result of the detector.

(7)

The imaging unit according to any one of (1) to (6), wherein the first correction section sets a threshold for change of the electronic hand shake correction accuracy to be different between when temperature rises and when the temperature falls.

(8)

The imaging unit according to any one of (1) to (6), wherein the first correction section sets a threshold for change of the electronic hand shake correction accuracy to be different between when a power voltage rises and when the power voltage falls.

(9)

The imaging unit according to any one of (1) to (8), wherein the first correction section is provided in a logic circuit that is stacked on the imaging device.

(10)

The imaging unit according to any one of (1) to (9), wherein the first correction section turns off electronic hand shake correction when the hand shake correction margin becomes lower than a certain value.

(11)

The imaging unit according to any one of (1) to (9), wherein the first correction section changes correction from electronic hand shake correction to optical hand shake correction when the hand shake correction margin becomes lower than a certain value.

(12)

An electronic apparatus provided with an imaging unit, the imaging unit including:

a detector that detects temperature or remaining battery capacity;

an imaging device that obtains a captured image; and a first correction section that changes, on a basis of a detection result of the detector, electronic hand shake correction accuracy with respect to the captured image obtained by the imaging device when an electronic hand shake correction function is enabled.

This application is based upon and claims the benefit of priority of the Japanese Patent Application No. 2015-095494 filed in the Japan Patent Office on May 8, 2015, the entire contents of which are incorporated herein by reference.

It should he understood by those skilled in the art that various modifications, combinations, sub-combinations, and alterations may occur depending on design requirements and other factors insofar as they are within the scope of the appended claims or the equivalents thereof.

What is claimed is:

1. An imaging unit, comprising:

a detector that detects temperature or remaining battery capacity;

an imaging device that obtains a captured image; and a first correction section that changes, on a basis of a detection result of the detector, electronic hand shake correction accuracy with respect to the captured image obtained by the imaging device when an electronic hand shake correction function is enabled, wherein in response to a first detection result of the detector a first hand shake correction accuracy is enabled, wherein in response to a second detection result of the detector a second hand shake correction accuracy is enabled, and wherein the first hand shake correction accuracy is higher than the second hand shake correction accuracy.

2. The imaging unit according to claim 1, wherein the first correction section changes, on the basis of the detection result of the detector, a size of a hand shake correction margin when a region including an object is cut out from the captured image.

3. The imaging unit according to claim 2, wherein the first correction section changes the number of pixels of the captured image on the basis of the detection result of the detector.

4. The imaging unit according to claim 3, wherein the first correction section includes an analog-to-digital converter that converts the captured image into digital data, and the analog-to-digital converter changes a size of an analog-to-digital conversion region in the captured image, on the basis of the detection result of the detector.

5. The imaging unit according to claim 1, wherein the first correction section includes a first analog-to-digital converter that converts the captured image into digital data, the imaging device includes a second analog-to-digital converter that converts the captured image into digital data, each of the first analog-to-digital converter and the second analog-to-digital converter changes a size of an analog-to-digital conversion region in the captured image, on the basis of the detection result of the detector, and the first correction section determines whether to use the first analog-to-digital converter or the second analog-to-digital converter, on the basis of the detection result of the detector.

6. The imaging unit according to claim 1, wherein the imaging device includes a second correction section that changes, on the basis of the detection result of the detector, the electronic hand shake correction accuracy with respect to the captured image obtained by the imaging device when the electronic hand shake correction function is enabled, and the first correction section determines whether to use the first correction section or the second correction section, on the basis of the detection result of the detector.

7. The imaging unit according to claim 1, wherein the first correction section sets a threshold for change of the electronic hand shake correction accuracy to be different between when temperature rises and when the temperature falls.

8. The imaging unit according to claim 1, wherein the first correction section sets a threshold for change of the electronic hand shake correction accuracy to be different between when a power voltage rises and when the power voltage falls.

9. The imaging unit according to claim 1, wherein the first correction section is provided in a logic circuit that is stacked on the imaging device.

10. The imaging unit according to claim 2, wherein the first correction section turns off electronic hand shake correction when the hand shake correction margin becomes lower than a certain value.

11. The imaging unit according to claim 2, wherein the first correction section changes correction from electronic hand shake correction to optical hand shake correction when the hand shake correction margin becomes lower than a certain value.

12. An electronic apparatus provided with an imaging unit, the imaging unit comprising:
- a detector that detects temperature or remaining battery capacity;
- an imaging device that obtains a captured image; and
- a first correction section that changes, on a basis of a detection result of the detector, electronic hand shake correction accuracy with respect to the captured image obtained by the imaging device when an electronic hand shake correction function is enabled, wherein in response to a first detection result of the detector a first hand shake correction accuracy is enabled, wherein in response to a second detection result of the detector a second hand shake correction accuracy is enabled, and wherein the first hand shake correction accuracy is higher than the second hand shake correction accuracy.

13. The imaging unit according to claim 1, wherein the detector detects temperature, wherein the first detection result is a first temperature, wherein the second detection result is a second temperature, and wherein the first temperature is lower than the second temperature.

14. The imaging unit according to claim 1, wherein the detector detects remaining battery capacity, wherein the first detection result is a first remaining battery capacity, wherein the second detection result is a second remaining battery capacity, and wherein the first remaining battery capacity is higher than the second remaining battery capacity.

15. The imaging unit according to claim 1, wherein the detector detects temperature.

16. The imaging unit according to claim 1, wherein the detector detects remaining battery capacity.

* * * * *